(12) United States Patent
Musgrove

(10) Patent No.: US 9,245,029 B2
(45) Date of Patent: *Jan. 26, 2016

(54) SEARCH SYSTEM WITH QUERY REFINEMENT AND SEARCH METHOD

(71) Applicant: TextDigger, Inc., San Jose, CA (US)

(72) Inventor: Timothy A. Musgrove, Morgan Hill, CA (US)

(73) Assignee: TEXTDIGGER, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/192,177

(22) Filed: Feb. 27, 2014

(65) Prior Publication Data

US 2014/0207751 A1    Jul. 24, 2014

Related U.S. Application Data

(63) Continuation of application No. 11/648,901, filed on Jan. 3, 2007, now Pat. No. 8,694,530.

(60) Provisional application No. 60/755,073, filed on Jan. 3, 2006.

(51) Int. Cl.
*G06F 17/30* (2006.01)

(52) U.S. Cl.
CPC .... *G06F 17/30864* (2013.01); *G06F 17/30011* (2013.01); *G06F 17/30672* (2013.01); *G06F 17/30705* (2013.01)

(58) Field of Classification Search
CPC .............. G06F 17/30672; G06F 17/30991; G06F 17/30554; G06F 17/30864; G06F 17/30011; G06F 17/30705

USPC ................... 707/765, 766, 767, 771; 715/968
See application file for complete search history.

(56) References Cited

U.S. PATENT DOCUMENTS

| 4,839,853 | A | 6/1989 | Deerwester et al. |
| 5,210,868 | A | 5/1993 | Shimada et al. |

(Continued)

FOREIGN PATENT DOCUMENTS

| EP | 1846815 A2 | 10/2007 |
| EP | 1851616 A2 | 11/2007 |

(Continued)

OTHER PUBLICATIONS

Office Action in U.S. Appl. No. 11/648,901, mailed Dec. 21, 2010.

(Continued)

*Primary Examiner* — Phong Nguyen
(74) *Attorney, Agent, or Firm* — Nixon Peabody LLP; Erik Birkeneder

(57) ABSTRACT

A search system and method for searching for electronic documents, and providing a search result in response to a search query. In one embodiment, the search system includes a processor, a user interface module adapted to receive a search query from a user that includes a search query term, a search engine that electronically searches for electronic documents that satisfy the search query term, and a query processing module that identifies at least one alternative term for the search query term, and provides the alternative term to the user interface module for display to the user, and also provides the alternative term to the search engine to search for electronic documents that satisfy the alternative term.

21 Claims, 8 Drawing Sheets

(56) References Cited

U.S. PATENT DOCUMENTS

| | | | |
|---|---|---|---|
| 5,237,503 | A | 8/1993 | Bedecarrax et al. |
| 5,278,980 | A | 1/1994 | Pedersen et al. |
| 5,301,109 | A | 4/1994 | Landauer et al. |
| 5,317,507 | A | 5/1994 | Gallant |
| 5,331,556 | A | 7/1994 | Black, Jr. et al. |
| 5,418,948 | A | 5/1995 | Turtle |
| 5,541,836 | A | 7/1996 | Church et al. |
| 5,544,049 | A | 8/1996 | Henderson et al. |
| 5,619,709 | A | 4/1997 | Caid et al. |
| 5,675,819 | A | 10/1997 | Schuetze |
| 5,694,592 | A | 12/1997 | Driscoll |
| 5,797,123 | A | 8/1998 | Chou et al. |
| 5,873,056 | A | 2/1999 | Liddy et al. |
| 5,913,215 | A | 6/1999 | Rubinstein et al. |
| 5,926,811 | A | 7/1999 | Miller et al. |
| 5,991,755 | A | 11/1999 | Noguchi et al. |
| 5,999,664 | A | 12/1999 | Mahoney et al. |
| 6,006,225 | A * | 12/1999 | Bowman ............ G06F 17/30395 707/999.004 |
| 6,029,167 | A | 2/2000 | Evans |
| 6,070,157 | A | 5/2000 | Jacobson et al. |
| 6,070,158 | A | 5/2000 | Kirsch et al. |
| 6,081,774 | A | 6/2000 | de Hita et al. |
| 6,088,692 | A | 7/2000 | Driscoll |
| 6,101,492 | A | 8/2000 | Jacquemin et al. |
| 6,128,613 | A | 10/2000 | Wong et al. |
| 6,161,084 | A | 12/2000 | Messerly et al. |
| 6,169,986 | B1 * | 1/2001 | Bowman ............ G06F 17/30395 707/999.004 |
| 6,182,066 | B1 | 1/2001 | Marques |
| 6,189,002 | B1 | 2/2001 | Roitblat |
| 6,256,629 | B1 | 7/2001 | Sproat et al. |
| 6,269,368 | B1 * | 7/2001 | Diamond .......... G06F 17/30395 707/999.004 |
| 6,360,215 | B1 | 3/2002 | Judd et al. |
| 6,405,190 | B1 | 6/2002 | Conklin |
| 6,453,315 | B1 | 9/2002 | Weissman et al. |
| 6,460,029 | B1 | 10/2002 | Fries et al. |
| 6,460,034 | B1 * | 10/2002 | Wical ................ G06F 17/30675 707/999.005 |
| 6,480,843 | B2 | 11/2002 | Li |
| 6,510,406 | B1 | 1/2003 | Marchisio |
| 6,519,586 | B2 | 2/2003 | Anick et al. |
| 6,523,026 | B1 | 2/2003 | Gillis |
| 6,523,028 | B1 * | 2/2003 | DiDomizio ....... G06F 17/30398 707/748 |
| 6,601,026 | B2 | 7/2003 | Appelt et al. |
| 6,647,383 | B1 | 11/2003 | August et al. |
| 6,665,681 | B1 | 12/2003 | Vogel |
| 6,675,159 | B1 | 1/2004 | Lin et al. |
| 6,684,205 | B1 | 1/2004 | Modha et al. |
| 6,711,585 | B1 | 3/2004 | Copperman et al. |
| 6,732,092 | B2 | 5/2004 | Lucas et al. |
| 6,735,583 | B1 * | 5/2004 | Bjarnestam ....... G06F 17/30017 707/999.004 |
| 6,766,316 | B2 | 7/2004 | Caudill et al. |
| 6,766,320 | B1 | 7/2004 | Wang et al. |
| 6,772,150 | B1 * | 8/2004 | Whitman .......... G06F 17/30448 707/721 |
| 6,816,858 | B1 | 11/2004 | Coden et al. |
| 6,820,079 | B1 | 11/2004 | Evans |
| 6,823,331 | B1 | 11/2004 | Abu-Hakima |
| 6,847,979 | B2 | 1/2005 | Allemang et al. |
| 6,865,575 | B1 | 3/2005 | Smith et al. |
| 6,947,930 | B2 | 9/2005 | Anick et al. |
| 7,024,400 | B2 | 4/2006 | Tokuda et al. |
| 7,082,426 | B2 | 7/2006 | Musgrove et al. |
| 7,089,236 | B1 * | 8/2006 | Stibel ................ G06F 17/3064 707/999.005 |
| 7,249,121 | B1 | 7/2007 | Bharat et al. |
| 7,254,576 | B1 | 8/2007 | Hamilton |
| 7,424,486 | B2 * | 9/2008 | Whitman .......... G06F 17/30448 707/999.005 |
| 7,437,670 | B2 | 10/2008 | Day et al. |
| 7,451,395 | B1 | 11/2008 | Brants et al. |
| 7,620,651 | B2 * | 11/2009 | Chea ................ G06F 17/30719 379/92.01 |
| 7,711,679 | B2 | 5/2010 | Patterson |
| 7,809,548 | B2 | 10/2010 | Mihalcea et al. |
| 7,844,589 | B2 * | 11/2010 | Wang ................ G06F 17/30864 707/706 |
| 7,856,441 | B1 * | 12/2010 | Kraft .................... G06F 17/3064 707/758 |
| 7,925,610 | B2 | 4/2011 | Elbaz et al. |
| 8,055,669 | B1 | 11/2011 | Singhal et al. |
| 8,265,925 | B2 | 9/2012 | Aarskog |
| 8,694,530 | B2 | 4/2014 | Musgrove |
| 8,732,197 | B2 | 5/2014 | Musgrove |
| 8,862,573 | B2 | 10/2014 | Musgrove |
| 2001/0037324 | A1 | 11/2001 | Agrawal et al. |
| 2001/0049677 | A1 * | 12/2001 | Talib ................ G06F 17/30622 707/999.004 |
| 2002/0046019 | A1 | 4/2002 | Verhagen et al. |
| 2003/0018659 | A1 | 1/2003 | Fuks et al. |
| 2003/0037041 | A1 | 2/2003 | Hertz |
| 2003/0050915 | A1 | 3/2003 | Allemang et al. |
| 2003/0115191 | A1 | 6/2003 | Copperman et al. |
| 2003/0126235 | A1 * | 7/2003 | Chandrasekar ... G06F 17/30864 709/220 |
| 2003/0164844 | A1 * | 9/2003 | Kravitz ............. G06F 17/30244 715/700 |
| 2003/0187649 | A1 | 10/2003 | Logan et al. |
| 2003/0187837 | A1 | 10/2003 | Culliss |
| 2003/0212654 | A1 | 11/2003 | Harper et al. |
| 2003/0217047 | A1 * | 11/2003 | Marchisio ........... G06F 17/2715 707/999.003 |
| 2003/0217052 | A1 | 11/2003 | Rubenczyk et al. |
| 2004/0030686 | A1 | 2/2004 | Cardno et al. |
| 2004/0059564 | A1 * | 3/2004 | Zhou ................ G06F 17/30672 704/4 |
| 2004/0064447 | A1 * | 4/2004 | Simske ............. G06F 17/30684 707/999.005 |
| 2004/0133418 | A1 | 7/2004 | Turcato et al. |
| 2004/0139059 | A1 | 7/2004 | Conroy et al. |
| 2004/0143600 | A1 | 7/2004 | Musgrove et al. |
| 2004/0205448 | A1 | 10/2004 | Grefenstette et al. |
| 2004/0236736 | A1 * | 11/2004 | Whitman .......... G06F 17/30448 707/999.003 |
| 2005/0015366 | A1 | 1/2005 | Carrasco et al. |
| 2005/0071332 | A1 * | 3/2005 | Ortega ............... G06F 17/2725 707/999.004 |
| 2005/0080614 | A1 | 4/2005 | Bennett |
| 2005/0080776 | A1 | 4/2005 | Colledge et al. |
| 2005/0080780 | A1 | 4/2005 | Colledge et al. |
| 2005/0165600 | A1 | 7/2005 | Kasravi et al. |
| 2005/0216447 | A1 * | 9/2005 | Talib ................ G06F 17/30622 707/999.003 |
| 2005/0267871 | A1 | 12/2005 | Marchisio et al. |
| 2005/0283473 | A1 * | 12/2005 | Rousso ................ G06F 17/3064 707/999.005 |
| 2006/0004747 | A1 | 1/2006 | Weare |
| 2006/0161520 | A1 * | 7/2006 | Brewer ................ G06F 17/3064 707/999.003 |
| 2006/0235843 | A1 | 10/2006 | Musgrove |
| 2006/0235870 | A1 | 10/2006 | Musgrove |
| 2007/0005590 | A1 * | 1/2007 | Thrasher ........... G06F 17/30648 707/999.005 |
| 2007/0011154 | A1 | 1/2007 | Musgrove et al. |
| 2007/0078832 | A1 | 4/2007 | Ott, IV et al. |
| 2007/0088695 | A1 * | 4/2007 | Bleyendaal ....... G06F 17/30696 707/999.005 |
| 2007/0174041 | A1 | 7/2007 | Yeske |
| 2007/0244855 | A1 | 10/2007 | Bates |
| 2007/0282811 | A1 | 12/2007 | Musgrove |
| 2008/0021925 | A1 | 1/2008 | Sweeney |
| 2008/0059451 | A1 | 3/2008 | Musgrove |
| 2008/0097985 | A1 | 4/2008 | Olstad et al. |
| 2008/0154875 | A1 | 6/2008 | Morscher et al. |
| 2009/0031236 | A1 * | 1/2009 | Robertson ......... G06F 17/30554 715/765 |
| 2009/0037457 | A1 | 2/2009 | Musgrove |
| 2009/0254540 | A1 | 10/2009 | Musgrove et al. |
| 2015/0074147 | A1 | 3/2015 | Musgrove |

(56) References Cited

U.S. PATENT DOCUMENTS

FOREIGN PATENT DOCUMENTS

| | | |
|---|---|---|
| EP | 1875336 A2 | 1/2008 |
| JP | 10-116290 A | 6/1998 |
| JP | 2000-339169 | 8/2000 |
| JP | 2000250919 | 9/2000 |
| JP | 2001184358 | 6/2001 |
| JP | 2008529173 A | 7/2008 |
| JP | 2008537225 A | 9/2008 |
| JP | 2008-538019 A | 10/2008 |
| WO | 2006086179 A3 | 8/2006 |
| WO | 2006096260 A3 | 9/2006 |
| WO | 2006110684 A3 | 10/2006 |
| WO | 2007081681 A2 | 7/2007 |
| WO | 2007114932 A3 | 10/2007 |
| WO | 2008097891 A3 | 8/2008 |
| WO | 2009059297 A1 | 5/2009 |

OTHER PUBLICATIONS

Office Action in U.S. Appl. No. 11/648,901, mailed Sep. 21, 2011.
Office Action in U.S. Appl. No. 11/648,901, mailed Mar. 26, 2012.
Office Action in U.S. Appl. No. 11/648,901, mailed Oct. 15, 2012.
Office Action in U.S. Appl. No. 11/648,901, mailed May 23, 2013.
Notice of Allowance in U.S. Appl. No. 11/648,901, mailed Nov. 27, 2013.
Notice of Allowance in U.S. Appl. No. 11/648,901, mailed Feb. 4, 2014.
Office Action in U.S. Appl. No. 11/730,930, mailed Jun. 19, 2008.
Office Action in U.S. Appl. No. 11/730,930, mailed Apr. 15, 2009.
Office Action in U.S. Appl. No. 11/730,930, mailed Aug. 5, 2009.
Office Action in U.S. Appl. No. 11/730,930, mailed Mar. 11, 2010.
Office Action in U.S. Appl. No. 11/343,083, mailed Feb. 21, 2008.
Office Action in U.S. Appl. No. 11/343,083, mailed Nov. 10, 2008.
Office Action in U.S. Appl. No. 11/343,083, mailed Mar. 23, 2009.
Office Action in U.S. Appl. No. 11/343,083, mailed Sep. 25, 2009.
Office Action in U.S. Appl. No. 11/343,083, mailed Jun. 4, 2010.
Office Action in U.S. Appl. No. 11/343,083, mailed Feb. 8, 2011.
Office Action in U.S. Appl. No. 12/025,200, mailed May 11, 2010.
Office Action in U.S. Appl. No. 12/025,200, mailed Jan. 19, 2011.
Office Action in U.S. Appl. No. 12/025,200, mailed Oct. 17, 2011.
Office Action in U.S. Appl. No. 12/025,200, mailed Sep. 12, 2012.
Office Action in U.S. Appl. No. 12/025,200, mailed Oct. 31, 2013.
Notice of Allowance in U.S. Appl. No. 12/025,200, mailed Jan. 2, 2014.
Office Action in U.S. Appl. No. 12/263,943, mailed Dec. 20, 2013.
Office Action in U.S. Appl. No. 12/263,943, mailed Aug. 15, 2012.
Office Action in U.S. Appl. No. 12/607,767 mailed Jun. 9, 2011.
Office Action in U.S. Appl. No. 12/263,943, mailed Jun. 7, 2011.
International Preliminary Report on Patentability for PCT/US2006/003312, mailed on Oct. 25, 2007.
International Search Report for PCT/US2006/003312, dated Sep. 24, 2007.
International Preliminary Report on Patentability for PCT/US2006/013369, mailed on Apr. 9, 2009.
International Search Report for PCT/US2006/013369, dated May 21, 2008.
International Preliminary Report on Patentability for PCT/US2007/00025, mailed on Jul. 17, 2008.
International Search Report for PCT/US2007/00025, dated Feb. 13, 2008.
International Preliminary Report on Patentability for PCT/US2007/08428, mailed on Oct. 16, 2008.
International Search Report for PCT/US2007/08428, dated Jul. 8, 2008.
Japanese Office Action in Application No. 2007-553342, dated Jul. 4, 2011.
Japanese Final Office Action in Application No. 2007-553342, dated Mar. 26, 2012.
Japanese Final Office Action in Application No. 2007-553342, dated Sep. 3, 2012.
Japanese Refusal in Application No. 2007-553343, dated Jan. 5, 2012.
Japanese Final Refusal in Application No. 2007-553343, dated Aug. 20, 2012.
International Search Report for PCT/US200852893, dated Jul. 23, 2008.
International Preliminary Report on Patentability for PCT/US200852893, mailed on Aug. 4, 2009.
International Search Report for PCT/US2008/082250, dated Dec. 30, 2008.
International Preliminary Report on Patentability for PCT/US2008/082250, mailed on May 4, 2010.
U.S. Appl. No. 12/607,767 mailed on Oct. 28, 2009.
U.S. Appl. No. 14/192,177, filed Feb. 27, 2014.
International Search Report for PCT/US200603313, dated Oct. 2, 2007.
International Preliminary Report on Patentability for PCT/US200603313, mailed on Oct. 23, 2007.
Advisory Action in U.S. Appl. No. 11/730,930, mailed Jun. 26, 2009.
Advisory Action in U.S. Appl. No. 11/648,901, mailed Feb. 2, 2010.
Notice of Allowance in U.S. Appl. No. 11/730,930, mailed May 13, 2014.
U.S. Appl. No. 14/243,812, filed Apr. 2, 2014.
"synset." WordNet® 3.0, Princeton University, Jun. 25, 2009. <Dictionary.com, http:dictionary.reference.com/browse/synset>.
Agirre, E. et al., "Exploring Automatic Word Sense Disambiguation With Decision Lists and the Web", Dated 2000, 9 pages.
Alani, H. et al., "Associative and Spatial Relationships in Thesaurus-based Retrieval,", Proceedings of the Fourth European Conference on Research and Advanced Technology for Digital Libraries, 2000, pp. 1-10.
Barrington, L. et al., "Combining Audio Content and Social Context for Semantic Music Discovery", Paper presented at the 32nd Annual ACM SIGIR Conference, Jul. 19-23, 2009. http://cosmal.ucsd.edu/~lbarring/pubs/Barrington-SIGIR09.pdf.
Beneventano, D. et al., "Building an Integrated Ontology within SEWASIE System", Proceedings of the First International Workshop on Semantic Web and Data-bases (SWDB), 2003.
Bruce, R. et al., "Word-Sense Disambiguation Using Decomposable Models", Computing Research Lab and Department of Computer Science, New Mexico State University,1994, 8 pages.
Budura, A. et al., "Neighborhood-based Tag Prediction", 6th Annual European Semantic Web Conference ESWC2009, vol. 5554 of Lecture Notes in Computer Science, Jun. 2009, pp. 608-622. http://people.csail.mit.edu/pcm/papers/TagPrediction.pdf.
Charniak, E., "A Maximum-Entropy-Inspired Parser", in Proceedings of NAACL-2000, pp. 132-139.
Chen, J-M. et al., "A Novel Approach for Enhancing Student Reading Comprehension and Assisting Teacher Assessment of Literacy", Computers & Education, vol. 55, Issue 3, Nov. 2010, pp. 1367-1382 (Abstract).
Collins, M.J., "A New Statistical Parser Based on Bigram Lexical Dependencies", Proceedings of the 34th Annual Meeting of the Association for Computational Linguistics, 1996, Santa Cruz, CA, pp. 184-191.
Durao, F. "Extending a Hybrid Tag-based Recommender System with Personalization", Paper presented, SAC '10 Proceedings of the 2010 ACM Symposium on Applied Computing, ACM New York, NY, USA 2010, pp. 1723-1727 (Abstract).
Fellbaum, C., ed., "WordNet: An Electronic Lexical Database," 1998, MIT Press, ISBN 0-262-06197-X.
Gildea, D. et al., "Automatic Labeling of Semantic Roles", Computational Linguistics, 2002, vol. 28, No. 3, pp. 1-45.
Guarino, N. "Formal Ontology and Information Systems", Proceedings of the International Conference on Formal Ontology in Information Systems (FOIS'98), Trento, Italy, 1998.
Gyllstrom, K. et al., "Seeing is Retrieving: Building Information Context from What the User Sees", Paper presented, IUI '08 Proceedings of the 13th International Conference on Intelligent User Interfaces, ACM New York, NY, USA 2008, pp. 189-198.

(56) References Cited

OTHER PUBLICATIONS

Hearst, M., "TextTiling: Segmenting Text into Multi-paragraph Subtopic Passages", Xerox PARC, Association for Computational Linguistics, 1997, pp. 33-64.
Hope, G. et al., "Convergence of Web 2.0 and Semantic Web: A Semantic Tagging and Searching System for Creating and Searching Blogs", International Conference on Semantic Computing, Sep. 1, 2007, pp. 201-208.
Itoh, H. et al., "Comparison and Superimposition Methods for Discovery of Relationship between Concept Systems", SIG-FAI-9904, Japan, Japanese Society for Artificial Intelligence, Mar. 21, 2000, pp. 65-70.
Joly, A. et al., "Contextual Recommendation of Social Updates, a Tag-based Framework", AMT, vol. 6335 of Lecture Notes in Computer Science, Springer 2010, pp. 436-447.
Leacock, C. et al., "Using Corpus Statistics and WordNet Relations for Sense Identification", Computational Linguistics, 24(1):147-165, 1998.
Lin, D., "Dependency-Based Evaluation of Minipar", In Workshop on the Evaluation of Parsing Systems, May 1998, Granada, Spain.
Martin, T., "Acquisition of Soft Taxonomies", IPMU-04, 2004.
Miller, G.A., "WordNet: A Lexical Database for English", Communications of the ACM, 38(11):39, 1995.
Nowviskie, B., "COLLEX: Semantic Collections & Exhibits for the Remixable Web", a preprint, Nov. 2005. http://www.nines.org/about/Nowviskie-Collex.pdf.
Ramakrishnan, G. et al., "Soft Word Sense Disambiguation", Department of Computer Science and Engineering, Indian Institute of Tech., Mumbai, India, Dated GWC 2004, pp. 291-298, Dec. 2003.
Sasumu, Akamine, "Flexible String Inversion Method for High-Speed Full-Text Search", Advanced Database Symposium '96, Information Processing Society of Japan, Dec. 2, 1996, vol. 96, No. 10, pp. 35-42.
Stamou, S., et al., "Retrieval Efficiency of Normalized Query Expansion", Computer Engineering and Informatics Department, Patras University, Research Academic Computer Technology Institute, 26221, Greece, CICLing 2005, LNCS 3406, pp. 604-607, Jan. 27, 2005.
Takeda, H., "The Present and the Future for Artifical Intelligence", Instrument and Control, Japan, The Society of Instrument and Control Engineers, Jun. 10, 2003, vol. 42, No. 6, pp. 508-511.
Tudhope, D. et al., "Augmenting Thesaurus Relationships: Possibilities for Retrieval", Journal of Digital Information, 2001, vol. 1, Issue 8, Article No. 41, pp. 1-20.
Turnbull, D. "Design and Development of a Semantic Music Discovery Engine", Dissertation Abstract, Publication No. 3320121, University of California, San Diego, Nov. 2008. Available at http://gradworks.umi.com/33/20/3320121.html.
Turnbull, D. et al., "Five Approaches to Collecting Tags for Music", Proceedings of the 9th International Conference on Music Information Retrieval, 2008, pp. 225-230.
van Rijsbergen, C.J., "Information Retrieval", 2nd Edition, 1979, http://citeseer.ist.psu.edu.
Wang, X. et al., "Chinese Weblog Pages Classification Based on Folksonomy and Support Vector Machine" Autonomous Intelligent Systems: Multi-Agents and Data Mining (Jun. 3-5, 2007), pp. 309-321.
Yang, H. et al., "Bridging the WWW to the Semantic Web by Automatic Semantic Tagging of Web Pages", Fifth International Conference on Computer and Information Technology, Sep. 21, 2005-Sep. 23, 2005, pp. 238-242.
Yarowsky, D. "Unsupervised Word Sense Disambiguation Rivaling Supervised Methods", Department of Computer and Information Science, University of Pennsylvania, Philadelphia, PA, Jan. 27, 1995, pp. 189-196.
Office Action in U.S. Appl. No. 11/343,084, mailed Mar. 25, 2009.
Office Action in U.S. Appl. No. 11/343,084, mailed Sep. 30, 2009.
Office Action in U.S. Appl. No. 11/343,084, mailed Apr. 9, 2010.
Office Action in U.S. Appl. No. 11/343,084, mailed Nov. 22, 2010.
Office Action in U.S. Appl. No. 11/401,448, mailed Mar. 4, 2008.
Office Action in U.S. Appl. No. 11/401,448, mailed Nov. 6, 2008.
Office Action in U.S. Appl. No. 11/401,448, mailed Jun. 30, 2009.
Office Action in U.S. Appl. No. 11/401,448, mailed Mar. 5, 2010.
Office Action in U.S. Appl. No. 11/401,448, mailed Dec. 28, 2010.
Office Action in U.S. Appl. No. 11/401,448, mailed Sep. 13, 2011.
Office Action in U.S. Appl. No. 11/401,448, mailed Apr. 10, 2013.
Office Action in U.S. Appl. No. 11/401,448, mailed Dec. 9, 2013.
Office Action in U.S. Appl. No. 11/648,901, mailed Dec. 31, 2008.
Office Action in U.S. Appl. No. 11/648,901, mailed Oct. 27, 2009.
Pilgrim, M., "Dive Into Python, Chapter 9, XML Processing", 2000 (last revised in 2004), Available online at http://www.diveintopython.net/xml_processing/.
Response to Election/Restriction Requirement in U.S. Appl. No. 11/343,084, filed Jun. 3, 2009.
Amendment and Response to Office Action in U.S. Appl. No. 11/343,084, filed Dec. 29, 2009.
Amendment and Response with RCE to Office Action U.S. Appl. No. 11/343,084, filed Oct. 12, 2010.
Appeal Brief Submission in U.S. Appl. No. 11/343,084, filed Aug. 23, 2011.
Examiner's Answer to Appeal Brief Submission in U.S. Appl. No. 11/343,084, filed Nov. 18, 2011.
Patent Board Decision in U.S. Appl. No. 11/343,084, filed Sep. 11, 2014.
Amendment and Response with RCE to Office Action in U.S. Appl. No. 11/343,084, filed Nov. 12, 2014.
Amendment and Response to Office Action in U.S. Appl. No. 11/401,448, filed Sep. 3, 2008.
Amendment and Response with RCE to Office Action in U.S. Appl. No. 11/401,448, filed May 6, 2009.
Amendment and Response to Office Action in U.S. Appl. No. 11/401,448, filed Dec. 29, 2009.
Amendment and Response with RCE to Office Action in U.S. Appl. No. 11/401,448, filed Aug. 27, 2010.
Amendment and Response to Office Action in U.S. Appl. No. 11/401,448, filed Jun. 28, 2011.
Amendment and Response with RCE to Office Action in U.S. Appl. No. 11/401,448, filed Mar. 12, 2012.
Amendment and Response to Office Action in U.S. Appl. No. 11/401,448, filed Oct. 10, 2013.
Amendment and Response with RCE to Office Action in U.S. Appl. No. 11/401,448, filed May 9, 2014.
Office Action in U.S. Appl. No. 11/401,448, mailed Dec. 9, 2014.
Amendment and Response to Office Action in U.S. Appl. No. 11/648,901, filed Jun. 29, 2009.
Response and Amendment After Final Office Action in U.S. Appl. No. 11/648,901, filed Jan. 22, 2010.
Amendment and Response with RCE to Office Action in U.S. Appl. No. 11/648,901, filed Nov. 29, 2010.
Amendment and Response with RCE to Office Action in U.S. Appl. No. 11/648,901, filed Aug. 22, 2011.
Amendment and Response to Office Action in U.S. Appl. No. 11/648,901, filed Mar. 21, 2012.
Amendment and Response with RCE to Office Action in U.S. Appl. No. 11/648,901, filed Sep. 25, 2012.
Amendment and Response to Office Action in U.S. Appl. No. 11/648,901, filed Apr. 15, 2013.
Amendment and Response with RCE to Office Action in U.S. Appl. No. 11/648,901, filed Oct. 23, 2013.
Examiner Initiated Interview Summary in U.S. Appl. No. 11/648,901, filed Nov. 27, 2013.
Examiner Initiated Interview Summary in U.S. Appl. No. 11/648,901, filed Feb. 4, 2014.
Amendment and Response to Office Action in U.S. Appl. No. 11/730,930, filed Dec. 18, 2008.
Response and Amendment After Final Office Action in U.S. Appl. No. 11/730,930, filed Jun. 12, 2009.
Amendment and Response with RCE to Office Action in U.S. Appl. No. 11/730,930, filed Jul. 15, 2009.
Amendment and Response to Office Action in U.S. Appl. No. 11/730,930, filed Jan. 5, 2010.
Pre-Brief Conference Request in U.S. Appl. No. 11/730,930, filed Sep. 13, 2010.

(56) References Cited

OTHER PUBLICATIONS

Pre-Brief Appeal Conference Decision in U.S. Appl. No. 11/730,930, filed Oct. 21, 2010.
Appeal Brief in U.S. Appl. No. 11/730,930, filed Nov. 22, 2010.
Examiner's Answer to the Appeal Brief in U.S. Appl. No. 11/730,930, filed Jan. 13, 2011.
Reply Brief in U.S. Appl. No. 11/730,930, filed Mar. 14, 2011.
Reply Brief Noted—Patent Board in U.S. Appl. No. 11/730,930, filed May 18, 2011.
Patent Board Decision—Examiner Reversed in U.S. Appl. No. 11/730,930, filed Feb. 27, 2014.
U.S. Appl. No. 14/512,062, filed Oct. 10, 2014.
Amendment and Response to Office Action in U.S. Appl. No. 11/343,083, dated Aug. 20, 2008.
Amendment After Final (After Notice of Appeal) in Office Action in U.S. Appl. No. 11/343,083, dated Mar. 9, 2009.
Appeal Brief in U.S. Appl. No. 11/343,083, filed May 11, 2009.
Response to Notice of Non-Compliant Appeal Brief in U.S. Appl. No. 11/343,083, filed Jul. 9, 2009.
Amendment and Response with RCE in Office Action in U.S. Appl. No. 11/343,083, dated Dec. 23, 2009.
Amendment and Response to Office Action in U.S. Appl. No. 11/343,083, dated Dec. 6, 2010.
Appeal Brief in U.S. Appl. No. 11/343,083, filed Mar. 8, 2012.
Examiner's Answer to Appeal Brief in U.S. Appl. No. 11/343,083, filed Apr. 26, 2012.
Amendment and Response to Office Action in U.S. Appl. No. 12/025,200, filed Nov. 11, 2010.
Amendment and Response to Office Action in U.S. Appl. No. 12/025,200, filed Jul. 19, 2011.
Amendment and Response with RCE in Office Action in U.S. Appl. No. 12/025,200, filed Apr. 17, 2012.
Amendment After Notice of Appeal in U.S. Appl. No. 12/025,200, filed Oct. 11, 2013.
Appeal Brief in U.S. Appl. No. 12/025,200, filed Oct. 15, 2013.
Notice—Defective Appeal Brief in U.S. Appl. No. 12/025,200, filed Oct. 16, 2013.
Response to Notice of Non-Complaint Appeal Brief in U.S. Appl. No. 12/025,200, filed Oct. 30, 2013.
Applicant Initiated Interview Summary in U.S. Appl. No. 12/025,200, filed Nov. 1, 2013.
Applicant Summary of Interview with Examiner in U.S. Appl. No. 12/025,200, filed Dec. 2, 2013.
Amendment and Response with RCE to Advisory Action in U.S. Appl. No. 12/025,200, filed Dec. 19, 2013.
Response to Notice to File Corrected Application Papers/Preliminary Amendment in U.S. Appl. No. 14/243,812, filed Jun. 25, 2014.
Applicant Response to Pre-Exam Formalities Notice and Preliminary Amendment in U.S. Appl. No. 14/243,812, filed Aug. 18, 2014.
Amendment and Response to Office Action in U.S. Appl. No. 12/263,943, filed Feb. 16, 2012.
Amendment and Response with RCE in Office Action in U.S. Appl. No. 12/263,943, filed Feb. 15, 2013.
Amendment and Response to Office Action in U.S. Appl. No. 12/263,943, filed Mar. 20, 2014.
Office Action in U.S. Appl. No. 12/263,943, dated Jul. 21, 2014.
Guha, R., et al., "Semantic Search", WWW 2003, Budapest, Hungary, May 20-24, 2003, pp. 700-709.
Mihalcea, Rada, et al., "PageRank on Semantic Networks, with Application to Word Sense Disambiguation", COLING '04, Association for Computational Linguistics, Aug. 2004, Article 1126, 7 pages.
Gong, Yihong, et al., "Generic Text Summarization Using Relevance Measure and Latent Semantic Analysis", SIGIR '01, New Orleans, LA, Sep. 9-11, 2001, pp. 19-25.
Deerwester, Scott, et al., "Indexing by Latent Semantic Analysis", J. of the American Society for Information Science, vol. 41, No. 6, © 1990, pp. 391-407.
Dave, Kushal, et al., "Mining the Peanut Gallery: Opinion Extraction and Semantic Classification of Product Reviews", WWW 2003, Budapest, Hungary, May 20-24, 2003, pp. 519-528.
Hu, Minqing, et al., "Mining and Summarizing Customer Reviews", KDD '04, Seattle, WA, Aug. 22-25, 2004, pp. 168-177.
Mani, Inderjeet, et al., "Multi-document Summarization by Graph Search and Matching", American Association for Artificial Intelligence, Dec. 10, 1997, 7 pages.
Amendment in U.S. Appl. No. 11/343,084, mailed Jul. 28, 2015.
Office Action in U.S. Appl. No. 11/343,084, mailed Sep. 21, 2015.
Office Action in U.S. Appl. No. 11/343,084, mailed Jan. 28, 2015.
Amendment in U.S. Appl. No. 11/401,448, mailed Jun. 5, 2015.
Office Action in U.S. Appl. No. 11/401,448, mailed Aug. 14, 2015.
Amendment in U.S. Appl. No. 14/243,812 dated Aug. 24, 2015.
Kawahara, Tatsuya, et al., "Key-Phrase Detection and Verification for Flexible Speech Understanding", ICSLP 1996, Philadelphia, PA, Oct. 3-6, 1996, pp. 861-864.
Gutwin, Carl, et al., "Improving browsing in digital libraries with keyphrase indexes", Decision Support Systems, vol. 27, Issues 1-2, Nov. 1999, pp. 81-104.
Koster, Cornelis H. A., et al., "Normalization and Matching in the DORO System", 21st BCS-IRRSG Annual Colloquium on IR Research, Glasgow, Scotland, © 1999, pp. 1-13.
Ermolayev, Vadim, et al., "Capturing Semantics from Search Phrases: Incremental User Personification and Ontology-Driven Query Transformation", Proc. of the 2nd International Cont. on Information Systems Technology and its Applications (ISTA 2003), © 2003, pp. 9-20.
Beaulieu, Micheline, et al., "Concept-based Interactive Query Expansion Support Tool (CIQUEST)", Dept. of Information Studies, Univ. of Sheffield, Jun. 2003, 102 pages.
Office Action in U.S. Appl. No. 14/243,812 dated Feb. 25, 2015.
Office Action in U.S. Appl. No. 11/401,448 dated Dec. 9, 2014.

* cited by examiner

After 2 seconds...

| | | |
|---|---|---|
| Now Searching:<br>Movies & TV | | |
| Context: rat pack,<br>comedy, singer | | |
| Hits: 37 | | |

FIG. 8A

After 5 seconds...

| | | |
|---|---|---|
| Movies & TV | Now Searching:<br>Sports | |
| Context: rat pack,<br>comedy, singer | Context: baseball,<br>coach, playoffs | |
| Hits: 37 | Hits: 8 | |

FIG. 8B

After 9 seconds...

| | | |
|---|---|---|
| Movies & TV | Sports | Now Searching:<br>Academia |
| Context: rat pack,<br>comedy, singer | Context: baseball,<br>coach, playoffs | Context:<br>Administration<br>Faculty, President |
| Hits: 37 | Hits: 8 | Hits: 34 |

FIG. 8C

SEARCH SYSTEM WITH QUERY REFINEMENT AND SEARCH METHOD

This application claims priority to U.S. patent application Ser. No. 11/648,901, filed Jan. 3, 2007, titled SEARCH SYSTEM WITH QUERY REFINEMENT AND SEARCH METHOD which claims priority to U.S. Provisional Application No. 60/755,073 filed Jan. 3, 2006, the contents of which are incorporated herein by reference.

BACKGROUND OF THE INVENTION

1. Field of the Invention

The present invention is directed to a search system and search method that includes query refinement, and to such a system and method including a user interface for facilitating user refinement of a search query.

2. Description of Related Art

Electronic searching across large document corpora using a search engine is one of the most broadly utilized applications on the Internet. One fundamental search technique used is the keyword-index search that revolves around an index of keywords from eligible target items. In this method, a user's inputted query is parsed into individual words (optionally being stripped of some inflected endings), whereupon the words are looked up in the index, which in turn, points to documents or items indexed by those words. Thus, the potentially intended search targets are retrieved. This sort of search service by a search engine is accessed countless times each day by many millions of computer and Internet users, and is the basis of the Internet search services provided by Lycos®, Yahoo®, and Google®.

Two main problems of keyword searches are (1) missing relevant documents (i.e. low recall), and (2) retrieving irrelevant ones (i.e. lack of precision). Most keyword search results obtained by a search engine do plenty of both. In particular, with respect to the first problem, the primary limitation of keyword searches is that, when viewed semantically, keyword searches can skip about 80% of the eligible documents because, in many instances, at least 80% of the relevant information will be indexed in entirely different words than words entered in the original query. Granted, for simple searches with very popular words, and where relevant information is plentiful, this is not much of a problem. But for longer queries, and searches where the relevant phrasing is hard to predict, results can be disappointing.

When irrelevant or inadequate search results are retrieved by the search engines in response to the submitted search query, the user typically expands and refines the search query. This is generally accomplished by manually deleting, adding, and/or replacing words in the original query, which all requires the user to manually type in such changes into the search field of the search engine. This also requires to the user to determine, look up, or guess, which terms in the original search query should be modified or replaced in order to obtain better search results from the search engine. Of course, further reformulated search queries may be required over and over again, in order to have the search engine ultimately retrieve the desired documents. This need for reformulating the search query is a common source of frustration for users of search engines who initially thought that the desired documents would be retrieved readily from their initial search query submitted.

The need for reformulating the search query is caused by the fact that the desired documents will have content with substantially the same meaning as the user's entered search query, but which are expressed in different grammar or using different vocabulary. Users can recognize instantly the relevance of such divergent expressions, but machines such as computer implemented search engines acting on the basis of matching keywords cannot make even the most common-sense determinations of sameness of meaning, even when the search query terms are enhanced with wildcards, spelling corrections, and stemming.

For example, a travel website containing a large database of hotel information that is well-structured, with tens of thousands of items, currently cannot determine that "hotel with activities for kids" is the same in meaning as "resort offering a recreation program for children". However, users could make that determination easily and instantly, even if the user possesses little knowledge of the travel industry. Because of the limitations of machines such as computers and software, the users submitting the search query have the task of reformulating queries in alternative ways rather than machines.

Therefore, there exists an unfulfilled need for a search system and method with query refinement that addresses the above noted limitations and disadvantages of conventional search engines and search methods. In particular, there exists an unfulfilled need for a search system and method that reduces the need for user's typing to delete, add, and/or replace the query words to refine the search query. In addition, there exists an unfulfilled need for such a search system and method which utilizes a user interface that supports, and does not detract from, the search task.

SUMMARY OF THE INVENTION

In view of the foregoing, an advantage of the present invention is in providing a search system with query refinement that facilitates the user in refining the search query.

Another advantage of the present invention is in providing such a search system with a user interface that reduces the need for deleting, adding, and/or replacing the words of the search query by typing.

Still another advantage of the present invention is in providing a search system with a user interface that supports, and does not detract from, the search task.

Another aspect of the present invention is providing a computer implemented method for searching electronic documents in which refinement of the query is facilitated.

Yet another aspect of the present invention is providing a computer readable media having instructions for providing a search engine that facilitates query refinement.

In accordance with one aspect of the present invention, a search system for searching for electronic documents and providing a search result in response to a search query is provided. In one embodiment, the search system includes a processor, a user interface module adapted to receive a search query from a user that includes at least one search query term, a search engine that electronically searches for electronic documents that satisfy the at least one search query term, and a query processing module that identifies at least one alternative term for the search query term, and provides the alternative term to the user interface module for display to the user, and also provides the alternative term to the search engine to search for electronic documents that satisfy the alternative term. Preferably, the search engine executes a search based on the search query term and the alternative term simultaneously.

In accordance with one embodiment, the search system further includes a terms database having a plurality of alternative terms for the search query term, the query processing module retrieving the alternative term from the terms database. The alternative term is a synonym of the search query term, and is preferably used in a same sense as the search query term is used in the search query. In another embodiment, the user interface module is adapted to allow the at least one alternative term to be unselected and removed from searching by the search engine. In addition, the at least one alternative term is a plurality of alternative terms, and the query processing module is adapted to provide only a selected number of the plurality of alternative terms to the search engine for searching. Furthermore, the user interface module is adapted to display the selected alternative terms. In accordance with another embodiment, the user interface module further displays additional alternative terms not provided to the search engine for searching upon user's selection of a link, and to allow user to select the displayed additional alternative terms to be provided to the search engine for searching.

In accordance with one implementation, the user interface module is adapted to display the canonical sense in which the search query term is presumed to be used. In addition, the user interface module is adapted to display alternative senses in which the search query term is used, and to allow user selection of the sense. Furthermore, the user interface module may be implemented to allow user defined sense to be added to the search system for the search query term.

In accordance with another embodiment, the user interface module is adapted to display domain category in which the search query term is presumed to be used. In such an implementation, the user interface module is adapted to display alternative domain categories in which the search query term is used, and to allow user selection of the domain category.

In accordance with still another embodiment, the user interface module is adapted to display part-of-speech in which the search query term is presumed to be used. In such an implementation, the user interface module is adapted to display alternative part-of-speech in which the search query term is used, and to allow user selection of the part-of-speech.

In accordance with another aspect of the present invention, a computer implemented search method for electronically searching documents, and providing a search result in response to a search query is provided. In one embodiment, the search method includes receiving a search query from a user that includes at least one search query term, electronically identifying at least one alternative term for the at least one search query term, electronically displaying the identified at least one alternative term for the user, and electronically executing a search for electronic documents that satisfy at least one of the search query term and alternative term. Preferably, the search is executed based on the search query term and the alternative term simultaneously.

In accordance with another embodiment, the alternative term is a synonym of the search query term, and is used in a same sense as the search query term is used in the search query. In still another embodiment, the search method includes unselecting the alternative term to indicate that the alternative term is not to be searched. In yet another embodiment, the at least one alternative term is a plurality of alternative terms, and the search method includes searching for only a selected number of the plurality of alternative terms, and displaying the selected alternative terms for the user. In this regard, the method may include selecting alternative terms to be searched, and unselecting alternative terms not to be searched.

In accordance with one example embodiment, the search method includes displaying for the user the canonical sense in which the at least one search query term is presumed to be used. In one implementation, the search method also includes displaying alternative senses in which the at least one search query term is used, and receiving user's selection of at least one alternative sense. In another implementation, the search method also includes adding a new sense for the at least one search query term.

In another example embodiment, the search method further includes displaying for the user, a domain category in which the at least one search query term is presumed to be used. In addition, the method includes displaying alternative domain categories in which the at least one search query term is used, and receiving user's selection of at least one alternative domain category.

In yet another example embodiment, the search method includes displaying for the user, a part-of-speech in which the at least one search query term is presumed to be used. In addition, the method includes displaying alternative parts-of-speech in which the at least one search query term is used, and receiving user's selection of at least one of the alternative part-of-speech.

In accordance with still another aspect of the present invention, a computer readable medium with executable instructions for implementing the above described system and method is provided.

These and other advantages and features of the present invention will become more apparent from the following detailed description of the preferred embodiments of the present invention when viewed in conjunction with the accompanying drawings.

BRIEF DESCRIPTION OF THE DRAWINGS

FIGS. 8A to 8C schematically illustrate time-sequenced instances of a domain category screen in accordance with one example implementation.

DETAILED DESCRIPTION OF THE PREFERRED EMBODIMENT

Figure 1:
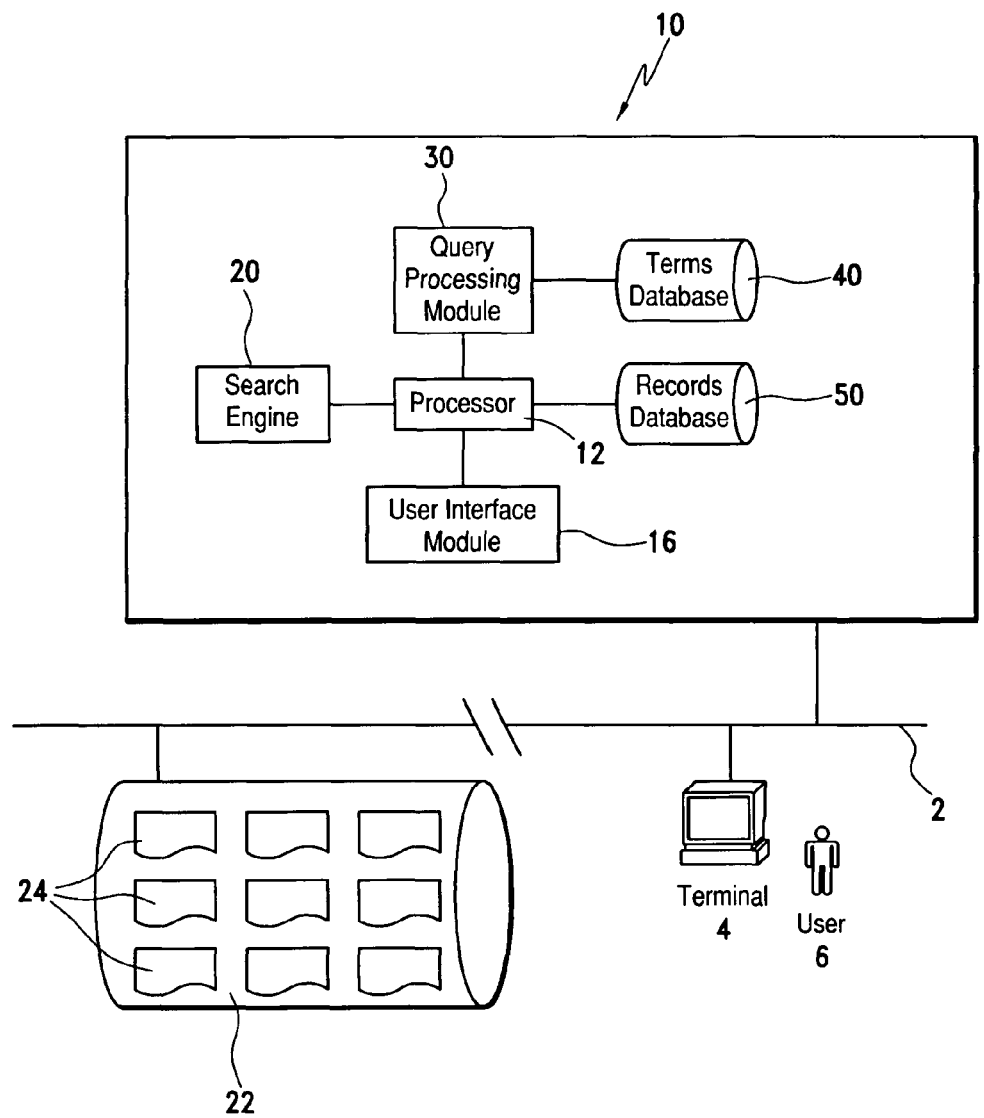
FIG. 1 is a schematic illustration of a search system with query refinement in accordance with one embodiment of the present invention.

FIG. 1 is a schematic illustration of a search system 10 in accordance with one embodiment of the present invention. The search system 10 receives a user search query and provides a search result, much like the conventional search engines. However, as explained in further detail below, the search system 10 includes features for facilitating query refinement which proposes alternative search terms to the user so that the user can then interact with the search system 10 to indicate appropriate alternative search terms that can be used to refine the search query, and retrieve the desired documents as search results. Moreover, the search system 10 also includes features for providing word sense information and alternative sense information, and a user interface that allows the user to change the word sense.

It should initially be understood that the search system 10 of FIG. 1 may be implemented with any type of hardware and/or software, and may be a pre-programmed general purpose computing device. For example, the search system 10 may be implemented using a server, a personal computer, a portable computer, a thin client, or any suitable device or devices. The search system 10 and/or components thereof may be a single device at a single location, or multiple devices at a single, or multiple, locations that are connected together using any appropriate communication protocols over any communication medium such as electric cable, fiber optic cable, or in a wireless manner.

It should also be noted that the search system 10 in accordance with the present invention is illustrated and discussed herein as having a plurality of modules which perform particular functions. It should be understood that these modules are merely schematically illustrated based on their function for clarity purposes only, and do not necessary represent specific hardware or software. In this regard, these modules may be hardware and/or software implemented to substantially perform the particular functions discussed. Moreover, the modules may be combined together within the search system 10, or divided into additional modules based on the particular function desired. Thus, the present invention, as schematically embodied in FIG. 1, should not be construed to limit the search system 10 of the present invention, but merely be understood to illustrate one example implementation thereof.

Referring again to the illustrated embodiment of FIG. 1, the search system 10 includes a processor 12 that is electronically connected to a user interface module 16, a search engine 20, and a query processing module 30, these modules being electronically interconnected by their connection to the processor 12 in the illustration of FIG. 1. The search system 10 also includes a refinement words database 40 which is electronically connected to the query processing module 30, and a records database 50 which is electronically connected to the processor 12. The functions of the various modules and components of the search system 10 are controlled by the processor 12, these functions being described in further detail below.

In addition, the search system 10 is further electronically connected to a documents database 22 via a network 2, the documents database 22 having a plurality of electronic documents 24 stored therein. It should be understood that as used herein, the term "electronic document" refers to any computer readable file, regardless of format. For instance, web pages of websites, word processing documents, presentation documents, spreadsheet documents, PDF documents, etc., are all examples of electronic documents referred to herein. It should also be evident that the documents database 22 illustrated is remotely located, and is in communication with the search system 10 via network 2 which may be the Internet. Of course, the documents database 22 is merely representative and a plurality of databases may be connected to the network 2 and accessed by the search system 10.

The user interface module 16 is adapted to receive a search query such as one or more search terms or a phrase from a user 6 of the search system 10 via a terminal 4 that is also connected to the network 2 such as the Internet. The search query is indicative of the content of documents that are of interest to the user 6. The user interface module 16 provides the search query to the query processing module 30 which processes the search query in the manner described in detail below, so that the search query can be provided to the search engine 20. The search engine 20 is adapted to search the documents database 22 to identify those documents from the plurality of electronic documents 24 that satisfy the search query that has been processed by the query processing module 30. Of course, searching of the documents database 22 by the search engine 20 may be attained in any appropriate manner, and can be facilitated by utilization of word indexes as already known in the art. Those electronic documents 24 which satisfy the search query are identified for the user 6 in a search results page generated on an interface screen on the terminal 4.

In the above regard, in accordance with the present embodiment, the query processing module 30 analyzes the terms or phrases of the search query received by the user interface module 16, and identifies and retrieves from the terms database 40, those terms that can be proposed to the user 6 for refining the search query which will enhance the likelihood that relevant documents are retrieved from the documents database 22 by the search engine 20. The alternative search terms that are stored in the term database 40 may be synonyms to the search query terms and be obtained from reference sources such as WordNet or electronic thesauri. Thus, the query processing module 30 of the search system 10 functions to identify those terms in the terms database 40 which are most likely to increase recall of the search results, while also preserving precision and relevancy of the documents retrieved. In one embodiment, this processing by the query processing module 30 may be performed before or after the actual search is performed by the search engine 20. However, in the preferred embodiment, this processing is performed simultaneously while the conventional search is performed by the search engine 20, and a selected number of these alternative terms identified by the query processing module are simultaneously searched by the search engine 20.

The advantage of the search system 10 in accordance with the present invention is apparent by the following example. Consider the apparently simple search query "kid pool". Most people will instantly understand that this query is about small swimming pools designed for children, and that "children's swimming pool" or "toddler's wading pool" are equally as relevant as the words of the search query. Now supposing the documents retrieved by the search engine in response to the search query does not include the document or information for a particular kiddy pool the user had in mind, the user would be in the all-too-familiar situation of coming up with alternative query strings or terms that must be resubmitted to the search engine. Rather than force the user to come up with them all from scratch, the query processing module 30 of the present invention provides suggestions to the user 6 that can be easily selected via the user interface 18 for incorporation into the search query.

For example, the search system 10 of the present invention can inform the user 6 that the term "children" is an alternative to "kid", and include such term in the search by the search engine 20 as well. The search system 10 can then offer to the user, the chance to de-select "children" via a user interface displayed by the user interface module 16 so as to remove this term for consideration if desired so that the search engine 20 can dynamically modify the search query being searched for. In addition, other less likely to be related terms such as "toddler" can be proposed to the user 6 if the user 6 indicates their desire to consider them (for example, by providing a link to such terms) so that they can be selected via the user interface for inclusion in the search by the search engine 20, preferably with single click, rather than having to type the term "toddler".

The providing of alternative search terms in response to a typed search query is not a simple task. In particular, the provision of alternative search terms may be difficult due to the number of synonyms for the words and the numerous different canonical senses in which words can be used. In the above noted example, there are more than 140 equivalent terms in an electronic thesaurus for the terms "kid" and "pool" combined. Automatically submitting all of such terms to the search engine 20 and/or displaying a list of 140 possible synonyms (and hypernyms and hyponyms) to a user 6 for a simple two-word query is not really a tenable option and is not useful to the user 6 submitting the search query. Such submission of all terms will likely result in references directed to subject that is clearly not related to the user's intended subject, and such an exhaustive presentation of alternative proposed search terms would severely detract from the search task.

In view of the above, the search system 10 in accordance with the preferred embodiment of the present invention only automatically submits selected number of alternative terms to the search engine 20, and only displays selected number of alternative terms for consideration by the user. Preferably, only a predefined number of the most pertinent alternative terms, or that which has the highest probability of being relevant which are automatically submitted to the search engine 20, are displayed for the user, without submitting or showing all possible alternative terms (all 140 possible terms in the case of the search query "kid pool").

In the preferred implementation, the alternative terms stored in the refinement words database 40 may be organized in clusters of words or "wordsets" that are grouped together based on having similar usage patterns or belonging to the same canonical word sense. The canonical senses of the search query terms and the alternative terms may be obtained from reference sources such as WordNet and stored in the terms database 40 and/or records database 50, or alternatively, retrieved as need from a reference source. The query processing module 30 can then identify and provide to the user interface module 16, the terms of the cluster that is deemed most likely to be relevant and for the correct canonical sense of the terms in the search query. Since even a single wordset may have too many words within it, a further collapsing can be performed by selecting just the most relevant words within the canonical sense of the query search term, and showing only select number of words likely to be the most relevant for automatic submission to the search engine 20 and display to the user 6, while hiding the rest of the words for optional display to the user for selection and submission to the search engine 20.

One system and method for determining which alternative terms are to be selected and initially proposed to the user and submitted to the search engine 20 is described in detail in patent application Ser. No. 11/401,448 filed Apr. 11, 2006, the contents of which are incorporated herein by reference. The system and method described in the '448 patent application utilizes prior probability scores for candidate synonym terms, and substitutes candidate synonym terms in order to determine those terms that are likely to be the most relevant. Of course, other systems, means and methods may be used for determining which alternative terms are to be selected and proposed, and the present invention is not limited to the specific implementation described in the '488 application. For example, the alternative terms may be stored in the terms database 40 with simple identifiers that indicates which terms are to be suggested as an alternative to a particular search query term.

The alternative terms are retrieved by the query processing module 30 and those indicated to be likely to be the most relevant to the search query are provided to search engine 10 and the user interface module 16. These terms are displayed on an interface screen for the user 6 via the terminal 4 by the user interface module 16, thereby informing the user 6 of the additional proposed terms that are being searched for by the search system 10 in response to the user's entered search query. The user interface module 16 allows the user 6 to de-select any of the proposed terms automatically submitted to the search engine 20 so as to dynamically reduce the number of terms the search engine 20 searches for. In addition, the user interface 16 further provides additional features for adding more alternative proposed terms or further disambiguating the senses for the terms used in the search query, as described in further detail below.

Figure 2:
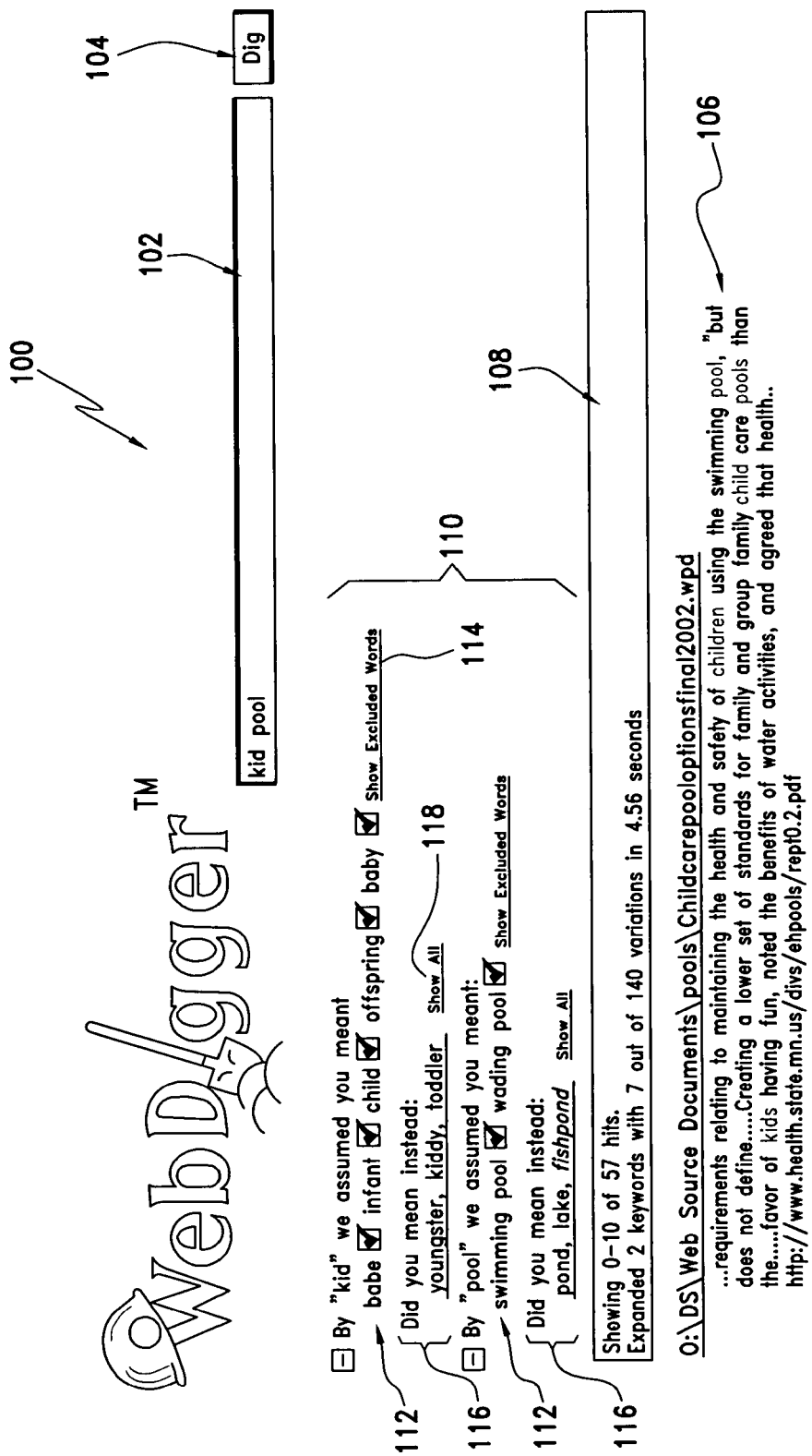
FIG. 2 is an interface screen generated by the search system in accordance one example implementation.

FIG. 2 shows an interface screen 100 that is generated by the user interface module 16 of the search system 10 in accordance one example implementation. As can be seen, the interface screen includes a search field 102 for entry of a search query by a user 6, in this case, "kid pool". The search process is initiated upon clicking on the submit button "Dig" 104. It is noted that the search field 102 in the illustrated implementation is merely provided with a single line for entry of the search query. However, for many search queries, the query processing module 30 can suggest better quality alternative terms if the user 6 enters a long enough query for there to be sufficient contextual information to allow topic and domain category selection to be performed accurately for the search. Unfortunately, users of the Internet are accustomed to entering fairly short queries which are usually two or three words. To encourage a different behavior, the search field 102 may be implemented by the user interface module 16 with multiple lines instead of the single line shown in the embodiment of FIG. 2. In this regard, if user types in less than a predetermined number of words into the search field 102, for example, less than five words, they can be prompted to enter more words by the user interface module 16 in other implementations.

In the illustrated embodiment of the search system 10, upon selection of the submit button 104, the search engine 20 identifies the documents that are relevant to the search query by examining the search index of the documents database 22 or by examination of the documents themselves. The results are preferably dynamically displayed in a search results field 106, only one result document being shown as an example, but many documents would be displayed in a listing as they are found. A status field 108 is also provided on the interface screen 100 by the user interface module 16 which displays the total number of relevant "hits" found by the search engine 20, and the number of hits being displayed. This feature of the search engine 20 and the user interface module 16 may be attained in any appropriate manner, including those used by presently available search engines. In addition, the interface screen 100 also displays other information related to query refinement performed by the query processing module 30 as discussed herein below.

The interface screen 100 of the illustrated embodiment which is generated by the user interface module 16 is also provided with a query refinement section 110 that facilitates the user 6 in refining the search terms that were submitted to the search engine 20. In this regard, the interface screen 100 displays numerous alternative terms 112 for each of the search terms, together with a selection indicator (in the form of a check box in the illustrated implementation) to indicate that the search term user's 6 search query has been expanded to include the indicated alternative terms 112.

In other words, the query processing module 30 automatically submits to the search engine 20, the identified alternative terms retrieved from the terms database 40 that are most likely to be relevant to the user's submitted search query, for simultaneous search with the originally submitted search terms. In addition, the user interface module 16 displays these alternative proposed terms to the user 6 in the query refinement section 110 of the interface screen 100, thereby informing the user that the user's search query has been expanded to include the indicated terms. Again, it should be noted that the query refinement section 110 merely displays to the user 6, select number of the likely pertinent alternative terms for the search terms out of the many that may be possible, so as to not detract from the search task.

In the above regard, explanatory text is provided in the query refinement section 110 that informs the user 6 that the search query term is being interpreted in a certain manner by the search system 10. Thus, as shown in FIG. 2, the query refinement section 110 states "By 'kid' we assume you meant", and lists the alternative terms 112, such as babe, infant, child, etc., which were submitted to the search engine 20 for searching as indicated by their corresponding selection status in the check boxes. The user 6 can de-select any of the check boxes to remove particular terms from being searched for by the search engine 20. Similar text with corresponding alternative terms submitted is provided for the search query term "pool" as shown.

It should be noted that different number of alternative terms are proposed for the search query terms "kid" and "pool". This occurs because the term "kid" has more terms that are likely to be highly relevant, whereas the term "pool" has fewer such terms, only two terms being deemed sufficient for automatic submission to the search engine 20. Thus, the number of terms to be submitted and displayed may be based on the relevance of the proposed terms to the search query term. Of course, a fixed, predetermined number of alternative terms may be used as a basis for determining how many alternative terms are displayed and submitted in other embodiments.

In addition, a link "Show Excluded Words" 114 is provided which, upon clicking thereon, the user interface module 16 displays the remaining alternative words in the interface screen 100 as described in further detail below. Moreover, alternative senses of the search words are displayed in the sense field 116 of the query refinement section 110 in the illustrated embodiment. In the present implementation, the user 6 is informed of the alternative senses by the text "Did you mean instead:" with other terms that correspond to an alternative sense of the search query terms. Thus, in this case, the user 6 is informed by the search system 10 that the search term "kid" was interpreted to mean a very young baby by the query processing module 30. However, an alternative sense of the same word refers to a child that is older who may also be referred to as "youngster, kiddy, toddler". As shown, the alternative terms in which the search query term "kid" corresponds to this older child sense is rendered as a link in the sense field 116 of the refinement section 110.

Furthermore, additional terms that correspond to still other alternative canonical senses for the search query term may be displayed by the user 6 by the selection of the link "Show all" 118. For example, upon selection of the link "Show all" 118, a link with alternative terms "joking, kidding" may be also displayed which informs the user 6 of this alternative canonical sense of the search query term "kid". Moreover, in other embodiments, the user may be allowed to selectively combine one or more of these alternative senses to broaden the search results instead of merely selecting one sense. This may be attained, for example, by listing the different senses, and providing a check box to allow the user to select the desired senses. However, including all of the senses would diminish the ability of the search system 10 to retrieve only those documents relevant to the user's intended search query.

Figure 3:
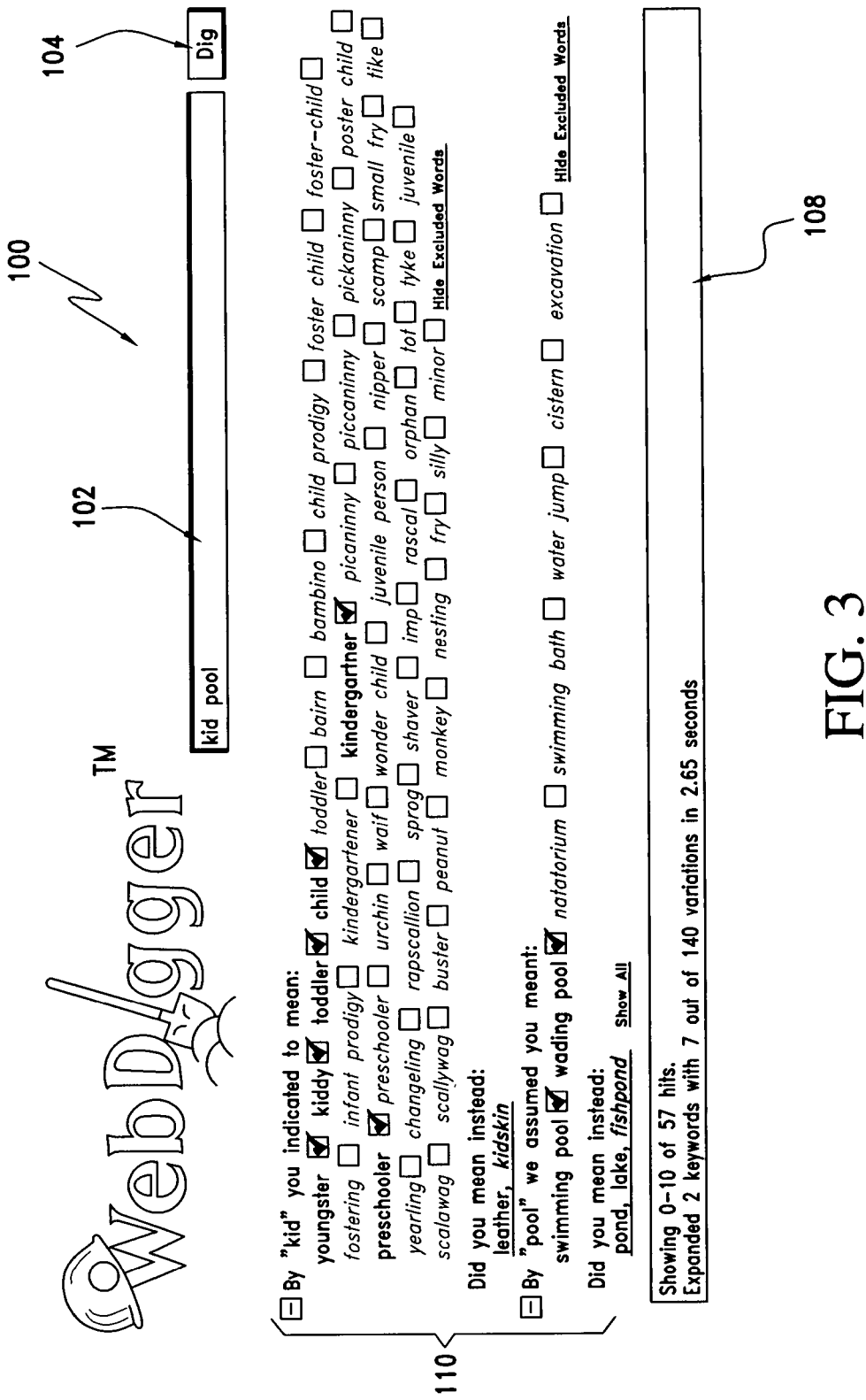
FIG. 3 shows the interface screen of FIG. 2 where the link "Show Excluded Words" has been selected by the user.

FIG. 3 shows the interface screen 100 of FIG. 2 in which the link "Show Excluded Words" 114 has been selected by the user 6 to display additional proposed terms which were previously hidden in FIG. 2. As can be seen, expanded alternative terms "kindergartner" and "preschooler" have been selected by the user 6 as indicated by their corresponding check boxes. As can also be seen, the non-selected (excluded) terms are grayed-out in the illustrated implementation to allow the user 6 to quickly peruse and identify those terms that are being searched for by the search system 10. Thus, the search system 10 in accordance with the present invention may be implemented to show the user 6 which of the words or wordsets should be included as query refinement terms, and which terms can be optionally selected for inclusion in a refined search query, without requiring the user to type in such refining terms.

In accordance with another embodiment, the search engine 20 of the search system 10 may be implemented so that the search query terms submitted by the user 6, such as the word "pool" in the example search query of FIGS. 2 and 3, must be found in the document for retrieval as a search result, whereas the alternative terms automatically submitted or selected for submission by the user 6 (by indicating, for example, by check box), need not be found. Finding of such alternative terms however, may be used to increase the relevance of the document containing them. In other words, referring to the example search query "kid pool" of FIGS. 2 and 3, the search system 10 may be implemented so that the word "kid" must be found in the document required for the document to be considered as a result for the search, but the term "toddler" merely adds points to the relevancy of the document that contains this term, and is not required to be found. Of course in other implementations, other strategies may be implemented by the search system 10. For example, another embodiment of the search system 10 may be implemented so that the alternative terms selected by the user must be found in the document. Moreover, the search system 10 may be implemented so that such features are user selectable.

Figure 4:
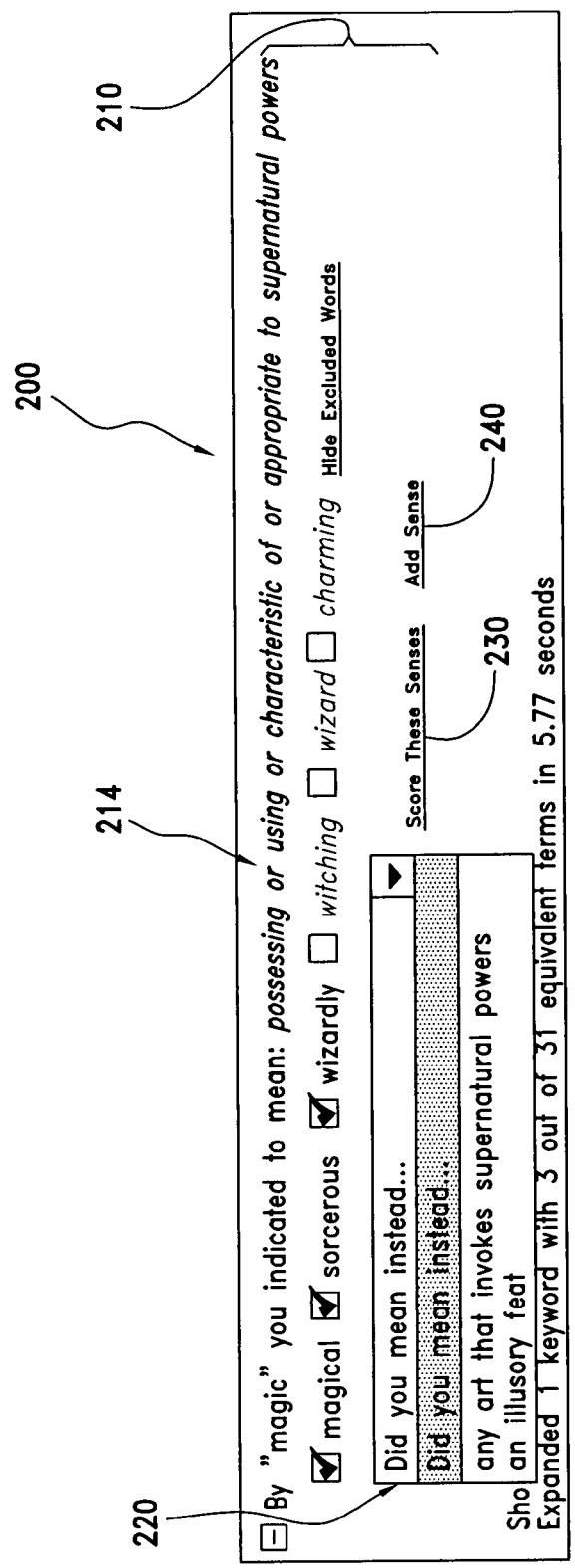
FIG. 4 illustrates a sense drop down menu for facilitating disambiguation of the sense for the terms of the search query.

FIG. 4 illustrates an interface screen 200 in accordance with another example implementation of the present invention including a sense drop down menu 220 in the refinement section 210 for facilitating disambiguation of the sense of the terms of the search query. As can be seen, the search query submitted by the user 6 included the term "magic", which is interpreted by the query processing module 30 to be used in a canonical sense of the practice or art which invokes supernatural powers. Correspondingly, this sense is displayed in sense field 214 of the refinement section 210, which in the illustrated search, reads "possessing or using or characteristic of or appropriate to supernatural powers". In addition, the query processing module 30 proposes alternative terms such as "magical", "sorcerous" and "wizardry" from the term database 40 based on this canonical sense of the word "magic".

Of course, the term "magic" can be used in different senses as well. Thus, in accordance with the illustrated implementation, the sense drop down menu 220 displays "Did you mean instead . . . " encouraging the user to take a look at the other senses of the search term that can be used in proposing alternative terms. In particular, alternative sense selections "any art that invokes supernatural powers" and "an illusory feat" are displayed upon selection of the sense drop down menu 220, thereby allowing the user 6 to change the sense of the word. As previously noted, such word sense information may be obtained from reference sources such as WordNet.

Changing of the sense of the word (to "an illusory feat" for example) causes the query processing module 30 to propose different alternative terms such as "illusion" and "trick" from the refinement database 40. These alternative terms are then displayed in the refinement section 210. Of course, the use of a drop down menu interface as a means for indicating the word sense is merely provided as one example, and other interfaces may be used such as listing with check boxes or links, etc. However, the use of a drop down menu interface ensures that the displayed refinement section 210 is simple and easy to understand by the user 6 so as to support the search task, while not detracting from the search task.

Furthermore, the sense of the search term which is selected by the user 6, as well as various other actions by the user 6, are preferably recorded by the search system 10 in records database 50, whether the sense is as originally understood by the query processing module 30, or is specifically selected by the user using the sense drop down menu 220. By merely selecting senses from the drop down menu 220, a user implicitly votes for the selected sense as being more dominant than another sense. By keeping track of the number of users that indicate a particular sense for a particular word in the records database 50, the search system 10 can determine which sense a search query is probably being used, and which alternative terms the query processing module 30 should initially present to the user 6 when the same or similar search query is received from a different user.

Of course, instead of the user interface provided above, other means of disambiguating the sense of the words of the search query may be used in other implementations of the present invention. For instance, alternative embodiments of the interface screen 100 shown in FIG. 2, verbs, prepositions, nouns and adjectives entered in the search field 102 can be probabilistically identified within the search query by the query processing module 30 by using any statistical part-of-speech tagger, several being available in the art. This information may be used by the query processing module 30 and displayed in the query refinement section 110 of the interface screen 100 generated by the user interface module 16. In addition, the query processing module 30 may further propose alternative parts-of-speech in the query refinement section 110 of the interface screen 100, for example:

"By 'kid' we assumed you meant the noun ('toddler', 'child').

Did you mean the verb ('joking', 'just kidding')?"

In still another alternative embodiment, the general domain category of discourse, or topic of the query, as guessed through an automated apparatus, e.g. sports, leisure, business, law, history, etc., can be utilized to bias which alternative terms are selected for expansion of the search query and displayed to the user. In this regard, this domain category selection itself can be displayed to the user to allow the user to change it, or to select no particular domain category at all. Thus, the drop down menu for the search term "magic" may instead, include selectable entries such as "entertainment", "religion" and "culture" corresponding to possible domains of the senses in which the search term "magic" is used. However, such general domains may not be readily apparent to the user. Therefore, the previously described drop down menu implementation in which the senses of the word are displayed provides a well balanced approach to disambiguating the senses of the words of the entered search query which supports the search task, but does not detract from the search task.

Figure 5:
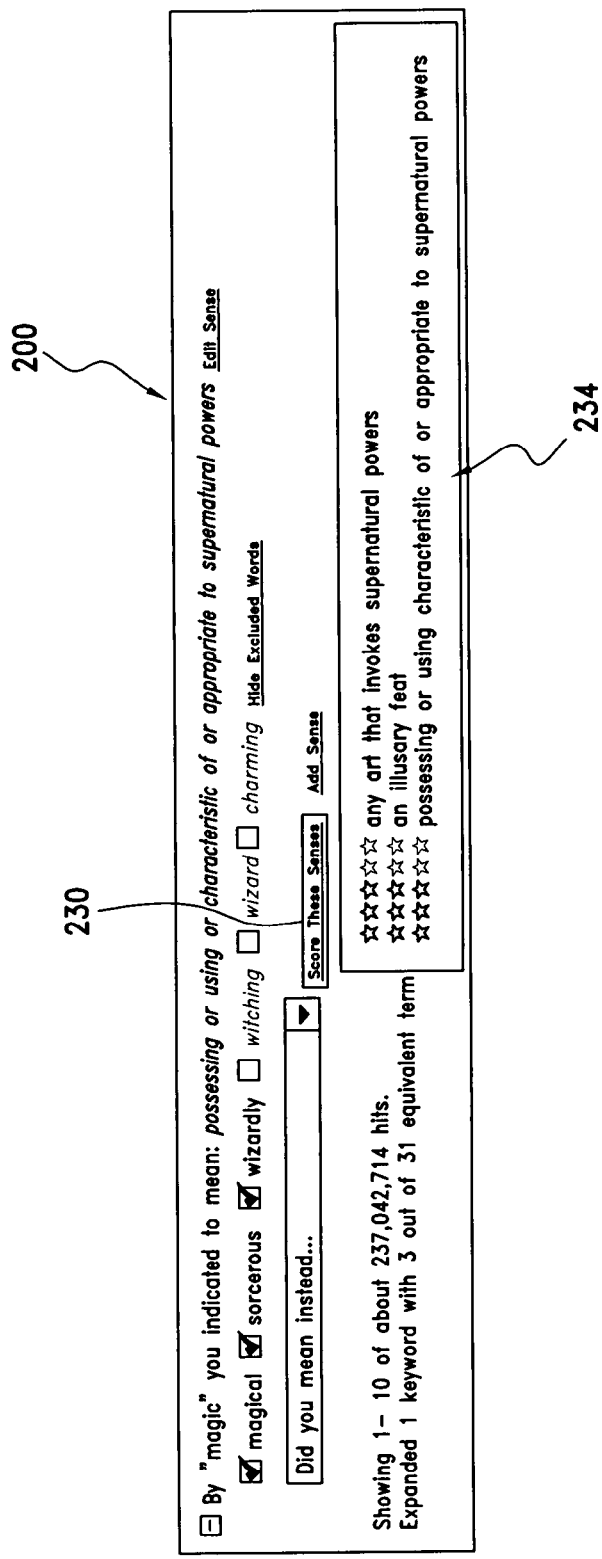
FIG. 5 illustrates sense scoring provided to the user.

In addition, the interface screen 200 of FIG. 4 further includes a sense scoring link "Score These Senses" 230, and a sense adding link "Add Sense" 240. FIG. 5 shows the interface screen 200 upon selection of the sense scoring link "Score These Senses" 230. As can be seen in the drop down sense rating field 234, the senses associated with the search term "magic" are listed, and a rating (number of stars in the illustrated implementation) is provided for each of the senses based on previous selections by other users.

The interface screen 200 is preferably implemented by the user interface module 16 to allow the user to rate the displayed senses, for example, by selection of one of the senses listed in the sense rating field 234. The user's ratings can then be used by the search system 10 to correspondingly adjust the global rating of these senses for the particular search query term. Preferably, the user's ratings are used to bias or weight the predicted sense for search queries that overlap partly, or completely, with the search query that was submitted by the user, or otherwise modified by the user. Moreover, such user's ratings are stored in the records database 50 of the search system 10 to adjust the global ratings for these senses for subsequently executed searches for the same or substantially similar search queries.

Figure 6:
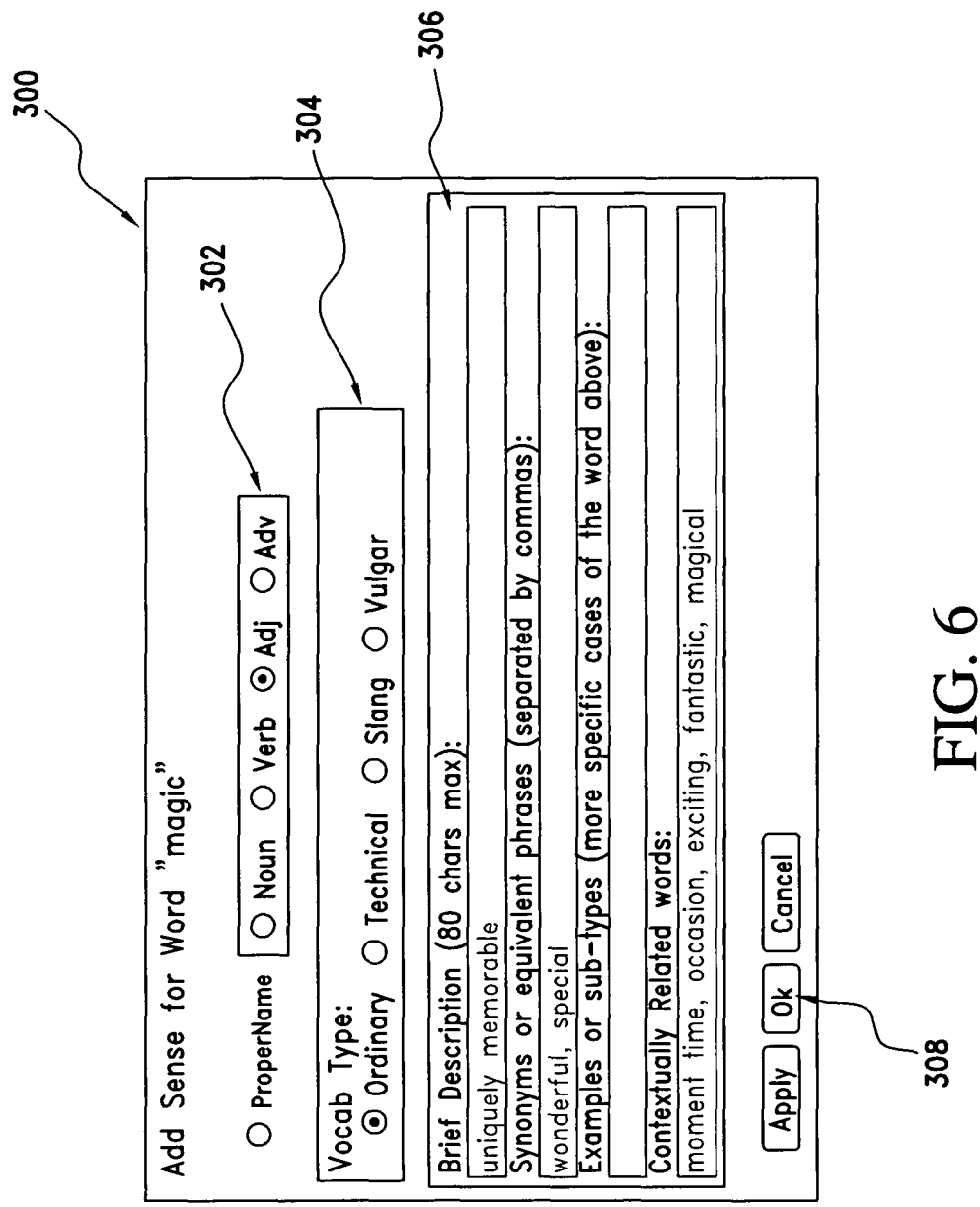
FIG. 6 illustrates an interface screen which allows the user to add a sense for a word.

FIG. 6 shows an add sense screen 300 that is displayed on the interface screen 200 by the user interface module 16 upon selection of the "Add Sense" link 240. This feature is illustrated as being used for adding a sense for the particular search word, in this example, the search word "magic" which is indicated at the top of the add sense screen 300. Such a feature can be used when the lexicon contains senses of the search term that is entirely different than those identified by the search system 10. For example, the search term "magic" shown and described above to FIGS. 4 and 5 pertains to supernatural powers and to the performance of illusions. However, it may also be used in the sense in which we say "it was a magic moment when my baby took her first steps." In such a case, user 6 could add this sense for the search term using the add sense screen 300.

In the above regard, the add sense screen 300 allows the user to indicate whether the word is a proper name, noun, verb, adjective, or an adverb in part-of-speech section 302. The vocabulary type selection 304 allows the user to identify whether the word is an ordinary word, technical word, slang word or a vulgar word. In addition, the add sense screen 300 further provides a user input field that 306 for the user to enter a brief description, synonyms/equivalents, examples, and contextually related words. These contextually related words are valuable for identifying the usage of this particular sense by later users and/or in source documents. The entered information can be added by selecting the "OK" button 308 which stores the added information in the terms database 40 and/or records database 50 of the search system 10, thereby adding the new sense for the word "magic" that is retrieved in subsequent searches for the same query term. Of course, the add sense screen 300 may be implemented to facilitate addition of multiple senses successively until all desired senses for the particular search term are added.

Figure 7:
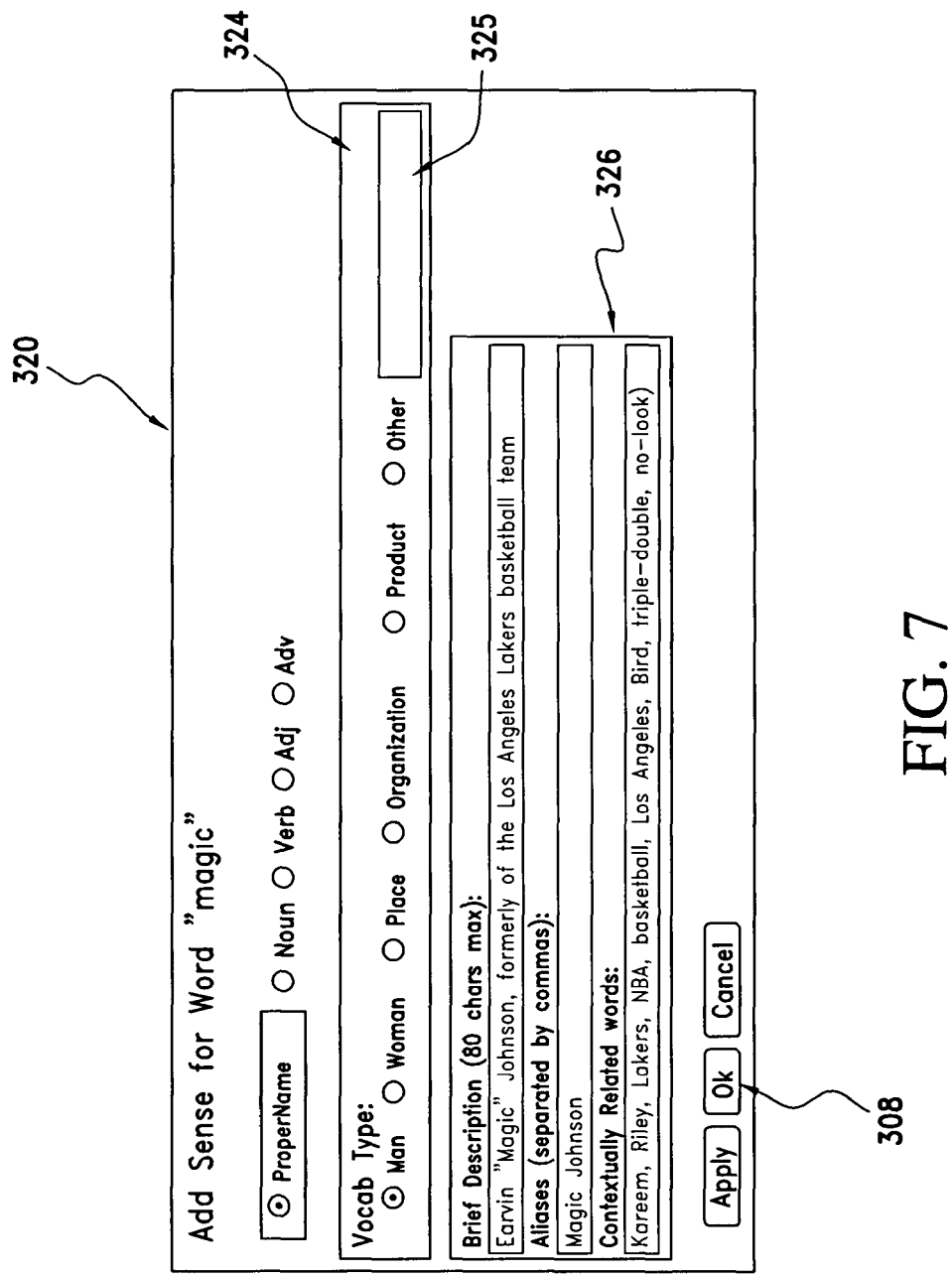
FIG. 7 shows the interface screen of FIG. 6 when adding a proper name.

In the illustrated embodiment of FIG. 6, if the user selects "Proper Name" in part-of speech section 302, the add sense screen is slightly modified to the display sense screen 320 shown in FIG. 7. The vocabulary type selection 324 allows the user to identify whether the name is for a man, woman, place, organization, product, or other name that can be entered in field 325. This is a rudimentary ontological classification, but nonetheless valuable in helping to disambiguate what kind of entity is intended. It is an important compromise between demanding a formal ontological specification from the user 6, and asking for none at all.

In addition, the add sense screen 320 further provides a user input field that 326 allows the user to enter a brief description, aliases, and contextually related words for the proper name. As can be seen, in the illustrated example, the word "magic" as used in the sense for "Magic" Johnson, the famous basketball player, is entered by the user. The entered information can be added by selecting the "OK" button 308 which stores the added information in the search system 10, thereby adding the new sense for the word "magic" that is retrieved in subsequent searches for the same search query.

Referring again to the general example implementation of the interface screen 100 shown FIG. 2, entry into the search query field 102 of words that are used in proper names may be identified by the query processing module 30 using any number of Named Entity Extraction tools that are available in the art, and the interface screen 100 modified accordingly. For example, if the search query entered contains the words "tiger woods", the query refinement section 110 of the interface screen 100 may be implemented to display:

"By 'tiger woods' we assumed you meant the sports celebrity.

Did you mean instead 'tiger' and 'woods' as regular words and not as a name?"

When there is ambiguity about a proper name, the query processing module 30 automatically selects the one most likely to be intended by the user, based on any other search query terms, or based on prior ratings by other users. However, the user interface module 16 of the search system 10 also informs the user of the search system's 10 assumption and presents the user, the option to modify the search system's 10 assumption. For example, there is a famous baseball coach and also a famous actor who are both named Dean Martin. There are fans of both celebrities who are actually unaware that the other one exists, and so, would not even know that the name is ambiguous. If the query submitted to the search system 10 by the user 6 is "Dean Martin playing a baseball player", it may be ambiguous to the query processing module 30 whether the user is talking about the actor portraying an athlete, or the coach deciding to utilize an athlete. In such instances, the search system 10 in accordance with the present invention may be implemented to display in the query refinement section 110:

"By 'Dean Martin' we assumed you meant the famous actor.

Did you mean instead the famous baseball coach?"

Optionally, since a highly disjunctive search which incorporates several alternative terms can take much more time and resources to perform by the search engine 20 than a standard query, the search system 10 may be implemented so that the user interface module 16 displays progressive results of the search on the interface screen 100 as the search is being performed. This may be implemented as a time-sequenced display in javascript of the domain categories and clusters that are constraining the search, i.e. showing the user what domain categories and clusters the search engine 20 is searching for the results. This will make waiting for search results more tolerable and possibly even fun for the user 6, and provides the user the opportunity to intervene before the searching is complete.

For example, the search system 10 in accordance with the present invention may be implemented so that the user interface module 16 displays on the query refinement section 110 of the interface screen 100:

"For your query 'Dean Martin Bio' we are searching the categories:

[√] Movies and TV [√] Sports [√] Academia."

In the above regard, FIGS. 8A to 8C schematically illustrate a domain category screen 400 that may be rendered in the status field 108, or in another area of the interface screen 100. However, the domain category screen 400 is preferably implemented in javascript, and displayed in a separate window. As can be seen, FIGS. 8A to 8C show three separate, time-sequenced instances (after 2, 5, and 9 seconds) of the domain category screen 400 that indicate the domain categories that are constraining the search being executed by the search engine 20. These domain categories are separated into different columns of the domain category screen 400 in the illustrated embodiment to facilitate easy comprehension by the user 6.

Thus, FIG. 8A indicates that the search query "Dean Martin Bio" is now being searched in the domain category of Movies & TV, that context of the search is "rat pack", "comedy" and "singer", and after two seconds of search, 23 hits have been identified thus far. FIG. 8B shows that the search query "Dean Martin Bio" is now being searched in the domain category of Sports, that context of the search is "baseball", "coach" and "playoffs", and after five seconds of total search, 8 hits have been identified, in addition to 37 hits in the prior domain category of Movies & TV. FIG. 8C indicates that the search query "Dean Martin Bio" is now being searched in the domain category of Academia, that context of the search is "Administration", "Faculty" and "Administration", and after 9 seconds of search, 34 hits have been identified, in addition to 37 hits in the prior domain category of Movies & TV, and 14 hits in the prior domain category of Sports.

The above information is preferably presented immediately on the query refinement section 110 of the interface screen 100, before the search results are fully displayed on the interface screen, so that the user 6 can interrupt the search before it is complete, for example, by unchecking one of the check boxes in domain categories or clusters that are irrelevant. Thus, if the user 6 was looking for information regarding Dean Martin, the actor, the user 6 can unselect "Sports" domain category which would substantially reduce the number of relevant documents, and the resources required by the search engine 20 of the search system 10.

In accordance with the preferred embodiment of the search system 10, the search results that are displayed dynamically for the user 6 in the search results field 106 as the search engine 20 progresses in the search. Furthermore, additional information may be displayed as the search system 10 is used, such as displaying estimated volume of hits as words/senses are selected, real-time suggestions (e.g. one user enters a new word and the search system 10 adds it to another user's suggestion list in real time), and other statistics.

The search system 10 may be implemented to also display complete variations of a search query, for example, in the status field 108, which can also be useful to the user in refining the search. In addition, the hit counts which are displayed in the status field 108 may be further detailed for each suggested alternative phrase, terms, senses, etc. In particular, even in a static form, it may be useful to the user 6 to see how many hits resulted from each of the suggested alternative phrases, terms, senses, etc. Such information provides the user 6 with clues into the potential value or return of a particular selection of suggested alternative phrases, terms, senses, etc.

If, for example, there are very many variations for saying "kid pool", a predetermined number of variations in order of hit volume or popularity may be displayed in the status field 108 of the user interface screen 100, and alternatively, could be displayed with an option to view all of such variations. Thus, for the shown search query "kid pool", the following top five alternatives and the corresponding number of hits may be displayed in the status field 108 of the interface screen 100:

"children's swimming pool" (1,450,000)
"toddler's swimming pool" (1,180,000)
"kiddie pool" (908,000)
"children's wading pool" (597,000)
"kiddy pool" (318,000).

As noted above, during execution of a search by the search engine 20, various information such as the search terms being processed, alternative terms being considered, etc. may be displayed for the user 6 by the user interface module 16. This information provides feedback to the user 6 and something to occupy the user while waiting for the relevant documents to be identified in the search results field 106, thereby providing a distraction which would make the wait seem shorter than it is, and further providing a sense that progress is being made. In addition, such information provided to the user 6 educates the user 6 as to what the search system 10 is actually doing, laying out the steps of query refinement and search execution, and also allowing the user to intervene, if desired.

The noted information may be displayed in many ways. For example, such information may be displayed in the user interface screen where the terms are already being shown to the user (e.g. the terms, variations, etc. appear and disappear as analysis progresses) using the existing fonts/colors or in a grayed/lighter color. Alternatively, such information may be displayed in a separate window in front of the user interface screen, similar to a customary progress dialog, with or without a progress bar or other animation such as an hourglass or rotating pie/clock graphic.

It should also be noted that alternate parses of search query terms and collocated words may also be addressed in one embodiment of the present invention. Collocated words are words or terms that form a single lexical unit that has a particular meaning that generally cannot be determined by looking at the individual terms separately, such as "ping pong" or "operating system". Part of the process of disambiguating what is intended by the terms of a user's query, even before selecting the correct sense of each word, includes determining what constitutes each lexical unit in the user's query. This can be difficult, especially in a non-formal environment such as user entered queries, where it is expected that many forms of a collocated word may be entered, even if not technically correct (e.g. "pingpong", "ping-pong" instead of "ping pong"). User 6 would expect similar search results to be returned by the search system 10 from a query containing a term of the form "commonsense", "common-sense", or "common sense".

The query processing module 30 of the search system 10 in accordance with the preferred embodiment is implemented to automatically select the parse that is deemed most likely from the user's search query. If a collocation is selected, it is presented to the user 6 via the user interface module 16 as if the it were a single semantic element of the search query, allowing the user to select a different sense, equivalent words, etc. in the manner described above. In the event that the parse is incorrect, the user interface module 16 may be implemented to also allow the user to alter the parse by way of adding additional senses, for example, in the manner also described.

For example, consider the query "operating system". By default, the search system 10 in accordance with the preferred embodiment is implemented to consider this query to contain a single word, "operating system" which is understood to be a single semantic unit. In addition to the senses of the collocated word, another sense can be added: ["operating" and "system"]. This indicates that the user meant the words as individual lexical units, which can have vastly different meaning than the collocation "operating system". Note that by selecting this different sense, the user is indicating that they are not looking for "operating system", as in computer software, and this fact can be useful to demoting search results that appear to be using "operating system" as a collocation in the computer software sense. Similarly, if the search system 10 automatically selects the parse with individual words, it is preferably implemented to also offer the collocation as an alternate parse that may be selected by the user.

Further to the above discussion relative to collocations, the occasional case of overlapping collocations is also appropriately handled by the search system 10. Consider the search query "operating system error". There are three possible parses:

["operating system" "error"];
["operating" "system error"]; and
["operating" "system" "error"].

In response to such a search query, the query processing module 30 of the search system 10 may be implemented to automatically select the first parse. If this is not what the user intended, the user interface module 16 of the above described implementation offers two ways to change the parse selection. In this regard, a drop down menu similar to that shown in the refinement section 210 of the interface screen 200 of FIG. 4 may be implemented to display the search terms "operating system", and in the drop down menu selections, to list the virtual senses of ["operating" "system error"] and ["operating" "system"], thereby allowing the user to select the desired sense. In addition, for the search term "error", the drop down menu may be provided which lists ["system error"] as an alternative sense. In other words, the user interface module 16 may be implemented to provide alternative ways of combining or splitting the search query terms. When an alternate parse is selected by the user, the user interface module 16 automatically splits pre-existing collocations as necessary, and preserves all prior user selections that apply to terms of the search query that are unaffected by the change to the parse.

It should be noted that in the preferred implementation of the present invention, the sense selection drop down menu 220 is re-purposed to accommodate the parsing selection in such instances, rather than providing another user interface element in the interface screen 200 to accommodate parsing selection. In other words, it is preferred to have the sense drop down menu 220 also perform the function of allowing parse selection just to display and allow tweaking of the various possible combinations/splittings of the terms of the search query, rather than providing a separate drop down menu, although such a separate menu may be implemented in other embodiments. The adding of an entirely new user interface element to the interface screen just to accommodate such parsing, which is a relatively rare need amongst the greater number of all use-cases, would be quite burdensome to most users, and would detract from the search task in most instances. In this regard, most users would consider it natural to understand a search query for two independent terms "operating" and "system", to be a different sense of the phrase "operating system".

In any implementations of the present invention described above, it is desirable for the search system 10 to keep a record of how the user 6 modifies a search being performed by the search engine 20 using the above described user interface and information displayed thereon. These informational records may be stored in the terms database 40 and/or records database 50 of the search system 10. Such records can then preferably used to improve the accuracy of the query processing module 30 in analyzing the received search query so that it can suggest better alternative search terms, phrases and senses in subsequently submitted search queries for the same, or similar, search terms.

Thus, the user's 6 selection by clicking on one or more links to the documents retrieved by the search engine 20 is preferably recorded by the search system 10, including which document was selected, and with what time-stamp relative to session start. If the selected document was retrieved based on its relatedness to a particular alternative search term that was suggested by the query processing module 30, such information can be then used by the query processing module 30 to increase the likelihood that the particular alternative search term be automatically suggested in the future for the same, or similar, search query.

In addition, information may be collected and stored with respect to the documents identified and provided as search results by the search system 10. In this regard, a simple rating system (for example, by the use of stars, thumbs-up/thumbs-down, a positive or negative number, yes or no as to relevance, etc.) may be employed by the user interface module 16 to collect the user's rating of each document identified as a search result in response to the search query. The ratings that are collected may be stored in the records database 50, together with information regarding the date of the search and the rating action.

As noted above, the senses of the search query terms, as selected by the query processing module 30 and/or the user 6, as well as the alternative terms equivalent words, are preferably recorded and stored in the records database 50 and/or the terms database 40. This information is important for utilizing the rating information, as opposed to the raw search query, and allows for greater re-use of the user ratings since the surface lexical units of the search query are reduced to more fundamental semantic units. The surface grammar of the search query may also be reduced to a canonical form in order to facilitate matching between search queries of different users that are equivalent. For example, the search queries "kid pool" and "pool for children" would be considered to be equivalent if the sense selections by the users submitting the search queries are the same. Furthermore, additional information such as the username of the user providing the ratings of the documents identified in the search results can be recorded and stored in the records database 50 so that the rating of the user can be factored into the ratings provided for the identified documents.

The search result is essentially a URL, and hence, can be used as a secondary key for each rating. The URL may be normalized in order to ensure future matching within search results where the URL may have trivial differences. Supplementary search result information such as excerpts from the search results, and crawl date may recorded and used to determine whether the result page has changed since it was rated. Such information may be taken into account when applying previous ratings to new searches. This information may also be used to present to the user, a search result that may not be retrieved by the search engine 20 in response to a future search query. In this regard, the original sort rank of the search result prior to application of the user rating(s) may also be stored in the records database 50.

The user ratings of the obtained search results are incorporated into the relevancy score of the documents identified as search results that are provided in response to a search query, hence affecting the final sort of the documents identified on the search results field 106. Ratings from the user may be given more influence over scores than ratings of the other users for the same query. Thus, when an identified document is rated, its position in the listing displayed on the search result field 106 can change immediately.

The changing of the ranking position of the rated document may be attained by the user interface module 16 with, or without, special graphical effects. Such graphical effects may cause the particular rated document to fade out of its existing position in the listing of the search results field 106, and then move and/or fade into its new position, with the user interface screen 100 scrolling as needed to keep in it in view of the user. Alternatively, the position of the rated document can simply appear in the new location on the listing displayed in the search results field 106 upon a subsequent search using a similar or the same query. In still another alternative, the user interface module 16 may be adapted to allow the user 6 to directly manipulate the location of a document to a more appropriate position on the listing displayed on the search results field 106. This may be attained by click and drag operation customarily accomplished using a mouse or other pointing device.

The user interface module 16 may further be implemented to allow the user to view rated documents of a search result only when they are available (either results that the user rated, or that all users rated, or both combined), thus providing a bookmarking type of feature. In addition, all of the documents identified through the search that are actually provided to the user 6 (i.e. which pages were served) are preferably recorded and stored in the records database 50 to allow use in determining which documents that were not rated by the user, were still possibly reviewed by the users, and which were not even looked at.

Furthermore, the search system 10 may be implemented with an "Advanced User" setting wherein a more elaborate interface screen is provided with various ancillary features and options and/or to allow the system more computation time. For example, in one implementation, a second submit button may be provided next to the submit button "Dig" 104, the second submit button being marked "Dig Deeper" which informs the user that selection of the second submit button provides a more advanced interface and options for performing the search. The above described interface screens and features may be implemented in such an advanced interface, or in the standard interface.

It should be apparent from the above discussion that the present invention provides a computer implemented search method for electronically searching documents, and providing a search result in response to a search query. As described above, the search method includes receiving a search query from a user that includes at least one search query term, electronically identifying at least one alternative term for the at least one search query term, electronically displaying the identified at least one alternative term for the user, and electronically executing a search for electronic documents that satisfy at least one of the search query term and alternative term. As explained, the search is preferably executed based on the search query term and the alternative term simultaneously. The alternative term is a synonym of the search query term, and is preferably used in a same sense as the search query term is used in the search query.

As also explained, the search method may include unselecting the alternative term to indicate that the alternative term is not to be searched. In this regard, the at least one alternative term may be a plurality of alternative terms, and the search method includes searching for only a selected number of the plurality of alternative terms, and displaying the selected alternative terms for the user. Moreover, the method may include selecting alternative terms to be searched, and unselecting alternative terms not to be searched. The search method also includes displaying for the user, canonical sense, a domain category, and/or part-of-speech in which the at least one search query term is presumed to be used. In addition, the method includes displaying alternatives that can be selected by the user.

Thus, it should be apparent from the above discussion that the present invention provides a search system and method in which, through a user interface, provides a reactive environment for enabling human users to greatly facilitate expanding, correcting, and refining a search query that has just been, or is about to be, submitted to the search engine of the search system. As can be appreciated from the description above, the system and method present invention increases recall while preserving, or even increasing precision. Importantly, the search system and method of the present invention allows achieving better search results in a shorter amount of time than would likely be attained by manual search query expansion and refinement by the user.

In particular, the present invention greatly facilitates query refinement by proposing alternative search terms to the user in a way that is convenient and effective. Such proposed alternative search terms offer linguistically related, but not always contextually relevant, synonyms, which makes approximate, but not perfect, domain category and sense assumptions about a search query. The user can then interact via the user interface as provided by the search system of the present invention to indicate appropriate alternative search terms and respective senses that can be used by the search engine to retrieve the desired search results.

While various embodiments in accordance with the present invention have been shown and described, it is understood that the invention is not limited thereto. The present invention may be changed, modified and further applied by those skilled in the art. Therefore, this invention is not limited to the detail shown and described previously, but also includes all such changes and modifications.

The invention claimed is:

1. A search system for searching for electronic documents, and providing a search result in response to a search query, comprising:
    a processor;
    a database, wherein terms in the database are grouped in a cluster based on the terms belonging to a same word sense;
    a user interface module adapted to receive a search query from a user, said search query having at least one search query term;
    a query processing module that automatically determines a single, assumed word sense for the at least one search query term selected from a list of retrieved senses for the search query term, and wherein said user interface module is adapted to display alternative senses in which said search query term is used that are different from and exclusive of the single assumed word sense, and to allow the user to select at least one of the alternative word senses, and wherein the query processing module identifies a plurality of any available alternative terms from a cluster based on the sense selected by the user, wherein the alternative terms include any available synonyms that are within the sense selected by the user;
    a search engine that electronically searches for electronic documents that satisfy said at least one search query term and said plurality of any available alternative terms; and
    wherein said user interface module is further adapted to display search results received from the search engine.

2. The search system of claim 1, wherein said search engine executes a search based on said search query term and said plurality of any available alternative terms simultaneously.

3. The search system of claim 2, wherein said user interface only displays said search results that satisfy at least one search query term and ranks said search results based at least in part on whether said search results satisfy said any available alternative terms.

4. The search system of claim 2, wherein said user interface progressively displays said search results.

5. The search system of claim 1, wherein said cluster is a collection of words grouped together based on having similar usage patterns.

6. The search system of claim 1, wherein said user interface module is adapted to display alternative domain categories in which said search query term is used, and to allow user selection of the domain category.

7. The search system of claim 1, wherein said user interface module is adapted to display a part-of-speech in which said search query term is presumed to be used.

8. The search system of claim 7, wherein said user interface module is adapted to display an alternative part-of-speech in which said search query term is used, and to allow user selection of the part-of-speech.

9. A computer implemented search method for electronically searching documents, and providing a search result in response to a search query, comprising:
    receiving, using a user interface module controlled by a computer processor, a search query from a user, said search query having at least one search query term;
    electronically and automatically determining, using a query processing module controlled by a computer processor, a single, assumed sense of said at least one search query selected form a list of retrieved sense for the search query term;
    displaying alternative senses in which said at least one search query term is used that are different from and exclusive of the single assumed word sense, and receiving the user's selection of at least one the alternative senses;
    electronically identifying, using the query processing module controlled by a computer processor, a plurality of available alternative terms from a cluster of terms belonging to a same word sense for the at least one search query term based on the user's selected alternative sense, wherein the plurality of available alternative terms include any available synonyms within the user's selected alternative sense; and
    electronically executing a search, using a search engine, for electronic documents that satisfy at least one of said search query term and the plurality of available alternative terms.

10. The search method of claim 9, further including executing the search based on said search query term and said plurality of available alternative terms simultaneously.

11. The search method of claim 9, further comprising displaying alternative domain categories in which said at least one search query term is used, and receiving user's selection of at least one alternative domain category.

12. The search method of claim 11, further including displaying for the user, a part-of-speech in which said at least one search query term is presumed to be used.

13. The search method of claim 12, further including displaying alternative parts-of-speech in which said at least one search query term is used, and receiving user's selection of at least one of the alternative part-of-speech.

14. A computer readable hardware medium with executable instructions stored thereon, which when executed by a computer processor, cause said computer to execute a method for searching for electronic documents, and providing a search result in response to a search query, the method comprising:
    receiving a search query from a user, said search query having at least one search query term;

electronically and automatically determining a single, assumed sense of said at least one search query term selected from a group of retrieved senses for said search query term;

displaying alternative senses in which said at least one search query term is used that are different from and exclusive of said single assumed word sense, and receiving the user's selection of at least one of the alternative senses;

electronically identifying a plurality of available alternative terms from a cluster of terms belonging to a same word sense for the at least one search query term based on the user's selection of the at least one alternative sense, wherein the plurality of available alternative terms include synonyms within the selected alternative sense; and electronically executing a search for electronic documents that satisfy at least one of said search query term and the plurality of alternative terms.

15. The computer readable medium of claim 14, further comprising executing the search based on said search query term and said plurality of available alternative terms simultaneously.

16. The computer readable medium of claim 14, further comprising displaying alternative domain categories in which said at least one search query term is used, and receiving the user's selection of at least one alternative domain category.

17. The computer readable medium of claim 14, further comprising displaying for the user, a part-of-speech in which said at least one search query term is presumed to be used.

18. The computer readable medium of claim 17, further comprising displaying alternative parts-of-speech in which said at least one search query term is used, and for receiving user's selection of at least one of the alternative part-of-speech.

19. A search system for searching for electronic documents, and providing a search result in response to a search query, comprising:

a processor;

a database, wherein terms in the database are grouped in a cluster based on the terms belonging to a same word sense;

a user interface module adapted to receive a search query from a user, said search query having at least one search query term;

a query processing module that automatically determines a single assumed domain category for the at least one search query term selected form a group of retrieved domain categories, and wherein said user interface module is adapted to display alternative domain categories in which said search query term is used that are different from and exclusive of the single assumed domain category, and to allow the user to select at least one of the alternative domain categories, and wherein the query processing module identifies a plurality of any available alternative terms from a cluster based on the domain category selected by the user, and wherein the plurality of any available alternative terms include any available synonyms within the domain category selected by the user;

a search engine that electronically searches for electronic documents that satisfy said at least one search query term and said plurality of available alternative terms; and wherein said user interface module is further adapted to display search results received from the search engine.

20. The search system of claim 19, wherein said search engine executes a search based on said search query term and said plurality of available alternative terms simultaneously.

21. The search system of claim 19, wherein said query processing module retrieves said plurality of available alternative terms from said database.

* * * * *